US008179424B2

(12) United States Patent
Moller

(10) Patent No.: US 8,179,424 B2
(45) Date of Patent: May 15, 2012

(54) 3D DISPLAY METHOD AND APPARATUS

(75) Inventor: Christian Nicolai Moller, Porsgrunn (NO)

(73) Assignee: Setred AS, Oslo (NO)

( * ) Notice: Subject to any disclaimer, the term of this patent is extended or adjusted under 35 U.S.C. 154(b) by 1379 days.

(21) Appl. No.: 11/569,048

(22) PCT Filed: Apr. 29, 2005

(86) PCT No.: PCT/IB2005/001480
§ 371 (c)(1),
(2), (4) Date: May 8, 2007

(87) PCT Pub. No.: WO2005/112474
PCT Pub. Date: Nov. 24, 2005

(65) Prior Publication Data
US 2008/0018732 A1    Jan. 24, 2008

(30) Foreign Application Priority Data
May 12, 2004    (GB) .................................. 0410551.6

(51) Int. Cl.
*H04N 13/02* (2006.01)
(52) U.S. Cl. ................. 348/46; 348/25; 348/43
(58) Field of Classification Search .............. 348/44, 348/46, 51, 42
See application file for complete search history.

(56) References Cited

U.S. PATENT DOCUMENTS

| 4,740,073 | A | | 4/1988 | Meacham |
| 4,853,769 | A | * | 8/1989 | Kollin ............................. 348/54 |
| 5,465,175 | A | * | 11/1995 | Woodgate et al. ............. 359/463 |
| 5,678,089 | A | * | 10/1997 | Bacs et al. ..................... 396/324 |
| 5,699,112 | A | | 12/1997 | Bacs, Jr. |
| 5,875,055 | A | | 2/1999 | Morishima et al. |
| 5,991,551 | A | * | 11/1999 | Bacs et al. ..................... 396/324 |
| 6,014,164 | A | | 1/2000 | Woodgate et al. |
| 6,128,132 | A | | 10/2000 | Wieland et al. |
| 6,172,807 | B1 | | 1/2001 | Akamatsu |
| 6,324,347 | B1 | | 11/2001 | Bacs, Jr. et al. |
| 6,377,295 | B1 | * | 4/2002 | Woodgate et al. .............. 348/59 |
| 6,603,504 | B1 | | 8/2003 | Son et al. |
| 6,674,463 | B1 | * | 1/2004 | Just et al. ......................... 348/43 |

(Continued)

FOREIGN PATENT DOCUMENTS
EP    0 541 374 A1    5/1993
(Continued)

OTHER PUBLICATIONS
File History for U.S. Appl. No. 12/297,590, filed Feb. 4, 2009.
(Continued)

*Primary Examiner* — Michael Won
(74) *Attorney, Agent, or Firm* — Patterson Thuente Christensen Pedersen, P.A.

(57) ABSTRACT

A method and apparatus directed to the field of autostereoscopic displays. The method provided is for creating images or image data suitable for use with an autostereoscopic display. The method comprises a projection step and a transformation step for processing item coordinates representing at least one item in a 3D scene to provide images or image data. The transformation step comprises calculating a transformation dependent on the geometry of an autostereoscopic display. The projection step comprises calculating a projection dependent upon a projection plane constructed in the 3D scene. The apparatus comprises an array of apertures and an imaging portion, the imaging portion comprising a plurality of Digital Micromirror Devices.

19 Claims, 14 Drawing Sheets

U.S. PATENT DOCUMENTS

| | | | |
|---|---|---|---|
| 6,712,471 B1 * | 3/2004 | Travis et al. | 353/7 |
| 6,795,241 B1 * | 9/2004 | Holzbach | 359/463 |
| 6,927,886 B2 * | 8/2005 | Plesniak et al. | 359/9 |
| 7,023,466 B2 * | 4/2006 | Favalora et al. | 348/42 |
| 7,043,073 B1 * | 5/2006 | Holzbach | 382/154 |
| 7,046,271 B2 * | 5/2006 | Doerfel et al. | 348/51 |
| 7,573,491 B2 * | 8/2009 | Hartkop et al. | 345/672 |
| 7,633,528 B2 * | 12/2009 | Fukushima et al. | 348/211.8 |
| 7,652,665 B2 * | 1/2010 | Fukushima et al. | 345/419 |
| 2001/0045951 A1 | 11/2001 | Allen | |
| 2003/0128871 A1 | 7/2003 | Naske et al. | |
| 2004/0057111 A1 | 3/2004 | Dominguez Motntes | |
| 2004/0070556 A1 | 4/2004 | Weitbruch et al. | |
| 2005/0099688 A1 | 5/2005 | Uehara et al. | |
| 2006/0012878 A1 | 1/2006 | Lipton et al. | |
| 2006/0262376 A1 * | 11/2006 | Mather et al. | 359/248 |
| 2008/0018732 A1 * | 1/2008 | Moller | 348/51 |
| 2009/0309887 A1 | 12/2009 | Moller et al. | |
| 2010/0026795 A1 | 2/2010 | Moller et al. | |

FOREIGN PATENT DOCUMENTS

| | | |
|---|---|---|
| EP | 0 625 861 A2 | 11/1994 |
| EP | 0 804 042 A2 | 10/1997 |
| EP | 0 847 208 A2 | 6/1998 |
| EP | 0 860 728 A1 | 8/1998 |
| EP | 1 089 573 A2 | 9/2000 |
| EP | 1 401 216 A2 | 3/2004 |
| GB | 2 206 763 A | 1/1989 |
| GB | 2 405 043 A | 2/2005 |
| GB | 2 405 517 A | 3/2005 |
| GB | 2 406 730 A | 4/2005 |
| GB | 2 406 731 A | 4/2005 |
| GB | 2 428 344 A | 1/2007 |
| JP | 10-322726 | 12/1998 |
| WO | WO 98/43441 | 10/1998 |
| WO | WO 03/054797 A2 | 7/2003 |
| WO | WO 2005/106572 A1 | 11/2005 |

OTHER PUBLICATIONS

File History for U.S. Appl. No. 12/297,581, filed Jan. 30, 2009.

Stereographics® Developers' Handbook; Background on Creating Images for CrystalEyes® and SimulEyes®; © 1997 SteroGraphics Corporation; 66 pages.

* cited by examiner

3D DISPLAY METHOD AND APPARATUS

The present invention is directed towards a method for rendering a three-dimensional image. In embodiments of the present invention, the three-dimensional image is suitable for display on an autostereoscopic display apparatus.

When a two eyed viewer looks at an object, each eye sees a slightly different view. Through a process called "stereopsis" the viewer's brain brings the two views together into a single three dimensional image.

Conventional 3D cinema systems use cameras incorporating two identical lenses that are spaced apart. This spacing may be chosen to match the average distance between a viewer's eyes, this is defined as the interocular distance. The separation distance between the lenses enables each lens to record both a left and a right view in a manner identical to a viewer looking at a scene. This facilitates realistic 3D image perception when the left view and the right view are appropriately projected.

During projection, the left view and the right view are simultaneously projected through projection lenses aligned to project both left eye and right eye views onto a screen.

In order to observe a 3D image, some form of filtering is required to ensure the left eye of a viewer only sees the left view and the right eye of the viewer only sees the right eye. In conventional 3D cinema systems, this is facilitated using either polarized glasses or a headset that includes electronic liquid-crystal shutter glasses.

Polarized glasses require polarizing filters to be applied to both lenses of the projector, preferably at alignments differing by 90 degrees. The alignment of the polarizing filters on the projector matches that of the alignment of each lens in the polarizing glasses. This ensures that each eye of the viewer sees the appropriate image, allowing the viewer's brain to create a single 3D image.

Instead of superimposing images, two sets of shutters within the 3D projector switch back and forth at 96 times per second to project alternate left and right eye images on the screen.

Shutter glasses comprise independently controlled electronic liquid-crystal shutters, one for each eye. The shutters are synchronized with the projector such that the left and right eye shutters in the glasses alternately open and close in conjunction with the projector shutters to make sure each eye of the viewer sees the appropriate image, again allowing the viewer's brain to create a single 3D image.

Parallax barriers are an alternative technology which does not require a viewer to wear any form of filtering device to observe a 3D image on a display. Instead, a parallax barrier is placed a distance in front of the screen, the parallax barrier comprising at least one narrow vertical opening, slit, or aperture. The parallax barrier provides a filtering effect in lieu of glasses because of the interocular distance of a viewer, such that a viewer looking through the aperture at a screen will see a different part of the screen with each eye.

Parallax barrier displays have been well known for many years. U.S. Pat. No. 2,107,464 granted to Radio Corporation of America in 1938 discloses a "grating 97 . . . interposed between the viewer's eyes and the fluorescent screen 77 so that the viewer's right eye can see several areas or elemental strips of the fluorescent screen designated as 107 and the left eye of the viewer will see the several areas or elemental strips generally designated as 109."

This underlines the basic principle behind displaying a 3D image. That is, each eye of the observer or viewer must see a slightly different perspective. Using a parallax barrier display, each eye of a viewer sees a different part of the screen behind the parallax barrier. This is similar to how a viewer may see behind objects in the foreground, for example: when looking through a set of railings, a viewer can see the entire scene behind them, each eye sees a different part of the scene and the brain processes the information to generate a complete scene.

FIG. 2 shows this principle. A parallax barrier 1 having a single aperture is disposed in front of a screen 2 which displays an image. The right eye 3 of a viewer sees portion 4 of the image; and the left eye 5 of the viewer sees portion 6 of the image.

Thus, a parallax barrier having a sufficiently small aperture width in front of a screen causes each eye of a viewer to see a different part of the viewing area of the screen. The viewing area of the screen is thus divided into discrete regions, each of which is viewed by a different eye, and so if different perspective images are shown in each of the discrete regions, then the viewer will see a 3D image.

However, unlike conventional 2D displays, where a viewer sees the same image independent of position, a viewer of a 3D parallax display will see a different image as the observation position changes. If the images are displayed so as to correspond to each eye being located within a different viewing region, wherein each image is selected to be a different perspective of the scene, then such a device will suffice as a 3D display. This approach will only give unfragmented images for each eye provided that neither eye is at the boundary between viewing regions. When the viewer changes position, as is prone to happen, he or she will observe jumps or discontinuities between adjacent views.

This is in contrast to real 3D scenes, where an observer sees the scene from a different angle or observes a different perspective as they change their viewing position. This effect may be observed by a passenger looking out of a window of a moving train; objects in the foreground move passed quicker than objects in the background. This is known as motion parallax or kineopsis and is an important depth cue.

Also important are extraretinal cues, which is information on eye position and movement. Vergence eye movements cause the fovea of both eyes to point at near objects. The fovea is the part of the retina having the highest concentration of cone cells. Vergence can provide reliable information for the judgment of distance to proximal targets in the absence of any other cues.

Conventional parallax barrier displays use either a static barrier or a scanning barrier. The static barrier is more common and requires a high resolution on a display screen behind the barrier. The scanning barrier has a plurality of openable apertures. The complete set of apertures is divided into a plurality of subsets of apertures. Each aperture in a subset of apertures is opened simultaneously and an image displayed behind each aperture in the subset. Each aperture, when open, presents a portion of a scene to a viewer. Each subset of apertures is opened cyclically such that, with persistence of vision, a complete representation of the scene is observed by the viewer. Scanning barrier displays require a display screen with a high frame rate.

Conventional parallax displays require slicing and multiplexing of a plurality of perspective views. This produces discontinuities as the observation position changes and furthermore only provides an approximation of the 3D scene.

Conventional scanning barrier parallax displays require a refresh rate equal to the refresh rate required for an viewer to perceive fluid motion multiplied by the number of groups of apertures, where all the apertures in a group are opened concurrently. Accordingly the refresh rate required of a 3D display is a factor greater than that required of conventional 2D display technology, and as such hardware optimized for displaying images at a high refresh rate is required.

Spatial multiplexed 3D displays use conventional 2D displays. Consider as an example a system which displays only 2 views. The system uses an LCD screen with a native resolution of 1000 pixels by 1000 pixels. This system uses a lenticular sheet above the screen, where the lenticule (i.e. mini lens) has a width of 2 pixels, and is arranged such that every odd pixel is transmitted/refracted to the left and every even pixel is transmitted/refracted to the right. Hence, if a viewer is positioned correctly he sees only odd pixels with his left eye and even pixels with his right eye, and so sees a stereo image. However, the image resolution for each eye which is equivalent to the total perceived resolution is only 500 pixels by 1000 pixels.

In general, a 3D parallax display device will have a perceived horizontal resolution equal to the native horizontal resolution of the 2D screen, divided by the number of views displayed. So by way of further example: a 5 view system where each lenticule covers 5 pixels displays 5 distinct images for different observation positions, but each eye of a viewer only perceives an image having a resolution of 200 pixels by 1000 pixels.

The two examples above sacrifice horizontal resolution to achieve stereo image display. This trade-off becomes increasingly disadvantageous as the view number increases, since the vertical resolution becomes much higher then the horizontal. For spatial multiplexed displays the product of the number of views and the 3D image resolution is equal to the native display resolution.

Conventional rendering algorithms for parallax barrier systems and lenticular systems utilize an image-multiplexing scheme that is only an approximation to real world three dimensional images. These algorithms are based on the view required for a certain direction; therefore they consider what a viewer should see in order to perceive an approximation to a 3D scene rather than the perspective and ray direction of a corresponding actual 3D scene. An improved approach and physically more correct is to render an image by considering light passing through an aperture.

Conventional rendering methods often require optimization for implementation on hardware of limited capability. Hardware is limited in terms of imaging bandwidth, i.e. how much information can be displayed which may be both in terms of screen refresh rate and also shutter switching time. Hardware is also limited in terms of image processing, both projecting and rendering. Typically, the more complex the image processing, the longer each image takes to create. Where the image is a frame of a continuous motion picture, then prolonged image creation times reduce the frame rate. This adversely affects the continuous motion perceived by the viewer.

When conventional rendering methods are not performed precisely, discontinuities are often created in a 3D image, providing an unclear and confusing image. This is clearly disadvantageous where a 3D display is deployed for use in a commercial or medical imaging environment.

Conventional methods which use a plurality of camera positions arranged to capture a scene at different perspectives through a shutter or lenticular sheet have blind areas 9 as shown in FIG. 1, where parts of a scene are not recorded. A parallax barrier 1 having a single aperture is shown spaced by a separation distance from a display 2. Five cameras $7_a$ to $7_e$ are shown in the plane of a viewer. An image captured by a camera 7 is displayed on the display 2. The filed of view of each camera 7 is restricted by the geometry of the system. In the situation shown, each camera $7_a$ to $7_e$ captures a portion of the scene $8_a$ to $8_e$ such that the captured views may be displayed side by side on the display 2, behind the aperture in the parallax barrier 1. This results in areas of the scene not being captured, or blind areas 9. Blind areas 9 occur unless an infinite number of cameras are used, which is of course impossible.

Traditional methods optimize the rendering for a set number of viewing positions. This means that discontinuities that will arise in all types of sampling will accumulate in areas seen from certain observation positions. Viewers of a display will move freely so it is advantageous if any discontinuities are spread evenly.

Traditional rendering for parallax barrier requires that slit width and the distance between the shutter and the display is set to a specific value for a desired viewing distance. This results in an inflexible system, which cannot accommodate observers in different positions. Further, by equal triangles, each stripe seen on the display will be slightly wider than a slit by a factor $$v/(v-d).$$

Accordingly, when the image displayed behind a slit comprises a composite of a plurality of substripes, each of a different perspective view, then:
  ii) each sub stripe is shifted an integer number of pixels for each jump in camera position for the same slit; and
  iii) each sub stripe is shifted an integer no. of pixels for each slit going left to right for the same camera position.

An important problem with parallax barrier displays is that they produce only a limited number of perspective views. This gives lower depth perception, jumpy motion parallax and low quality images when the viewer is in between views.

Another important problem is that of a limited viewing zone, or viewing angle. The viewing zone is static and cannot easily be adjusted. The main problem with this is that multiple viewers cannot see the same view with correct perspectives.

Another problem is that resolution and/or colour is sacrificed for creating the 3D effect. Conventional display apparatus only allow light to be transmitted from a limited fraction of a screen at any one time, thus reducing the observed brightness of the display.

Conventional time multiplexed autostereoscopic displays are often bulky and cumbersome, due to the associated optics. Their counterparts, spatial multiplexed displays, such as lenticulars and fixed parallax barriers, can be made flat panel using conventional display technology. The present invention allows for a flat panel time multiplexed display. Another problem common for 3D displays, both spatial and time multiplexed systems, is their limited viewing angle. The present invention can be arranged such as to provide 3D over a wide field of view.

According to an aspect of the present invention, there is provided an image suitable for use with an autostereoscopic display, said image comprising a view of a 3D scene, the image having a first perspective in a horizontal direction corresponding to a first observation distance and a second perspective in a vertical direction corresponding to a second observation distance.

Preferably, the first observation distance is an aperture distance. Preferably, the second observation distance is a typical viewing distance.

According to an aspect of the present invention, there is provided a method of creating an image suitable for use with an autostereoscopic display, said method comprising transforming a plurality of 3D coordinates of a 3D scene such that the image has: a first perspective in a horizontal direction corresponding to a first observation distance; and a second perspective in a vertical direction corresponding to a second observation distance.

Preferably, the first observation distance is an aperture distance. Preferably, the second observation distance is a typical viewing distance.

According to an aspect of the present invention, there is provided a method of creating image data, the image data suitable for use with an autostereoscopic display, said method comprising: projecting a plurality of item coordinates representing at least one item in a 3D scene onto a projection plane to generate a plurality of projection coordinates; transforming one of the group comprising: the item coordinates and the projection coordinates, wherein the transforming depends upon the geometry of the autostereoscopic display.

Preferably, the step of transforming is arranged to provide a corrected perspective of the rendered perspective view of the 3D scene.

Preferably, the transforming is performed on the projected coordinates, wherein the projection step precedes the transforming step.

Preferably, the 3D scene is stored in hardware and the projecting step comprises forming a projected image of the scene with a virtual camera at an observation position. Alternatively, the 3D scene is stored in hardware and the projecting step comprises forming a projected image of the scene with a virtual camera at an aperture position.

In an alternative, the transforming is performed on the item coordinates, wherein the projection step follows the transforming step.

Preferably, the projecting step comprises forming a projected image of the scene with a virtual camera at an aperture position.

Alternatively, the projecting step comprises forming a projected image of the scene with a virtual camera at an observation position.

Preferably, the transforming implements a camera positioned at a shutter spacing, the camera having a scaled frustum and translated y coordinates.

Preferably, the transforming implements a camera positioned at an observation distance, the camera having capturing a scene having scaled x coordinates.

Preferably, the transformation step implements a camera positioned at a shutter spacing, the camera having a non-linearly scaled frustum and translated y coordinates.

Preferably, the transformation is dependent upon a geometric consideration of an aperture.

Preferably, the geometric consideration of the aperture includes: aperture width; a separation distance between an image display surface and the aperture; and a typical observation distance.

Preferably, the image data comprises an image segment, a 2D representation of a 3D scene, or information about a 2D representation of a 3D scene.

Preferably, the image data comprises an image having a first perspective in a horizontal direction corresponding to a first observation distance and a second perspective in a vertical direction corresponding to a second observation distance.

According to an aspect of the present invention, there is provided a method for creating an image segment, the image segment suitable for use with a parallax barrier 3D display having a plurality of apertures, said method comprising: projecting a plurality of item coordinates of at least one item in the 3D scene onto a projection plane; the method characterized in that a transformation is performed on the item coordinates, the transformation determined by the aperture geometry of the parallax barrier 3D display.

According to an aspect of the present invention, there is provided a method for creating an image segment corresponding to a 3D scene, the image segment for use with an autostereoscopic display device, the autostereoscopic display device arranged to display a particular area of a display plane dependent upon a viewing angle, the image segment created for display on the display plane such that when displayed on the display plane, a particular area of the image segment is displayed, wherein the particular area of the image segment displayed corresponds to a perspective view of the 3D scene.

Preferably, the particular area of the image segment displayed corresponding to a perspective view of the 3D scene is substantially identical to that which would be observed through a window.

Preferably, the autostereoscopic display operates so as to display a portion of an image dependent upon a viewing angle.

Preferably, the viewing angle is a horizontal viewing angle in a horizontal plane.

According to an aspect of the present invention, there is provided a graphics processing apparatus for use in a computer system, the graphics processing apparatus comprising: means for projecting a plurality of item coordinates representing at least one item in a 3D scene onto a projection plane to generate a plurality of projection coordinates; means for transforming one of the group comprising: the item coordinates and the projection coordinates, wherein the transforming depends upon the geometry of the autostereoscopic 3D display.

According to an aspect of the present invention, there is provided a graphics processing apparatus for use in a computer system, the graphics processing apparatus comprising: a projection unit for projecting a plurality of item coordinates representing at least one item in a 3D scene onto a projection plane to generate a plurality of projection coordinates; a transforming unit for transforming one of the group comprising: the item coordinates and the projection coordinates, wherein the transforming depends upon the geometry of the autostereoscopic 3D display.

According to an aspect of the present invention, there is provided a graphics processing apparatus for use in a computer system, the graphics processing apparatus comprising means for creating image data representing an image of a 3D scene, the image having a first perspective in a horizontal direction corresponding to a first observation distance and a second perspective in a vertical direction corresponding to a second observation distance.

Preferably, the graphics processing apparatus is incorporated onto a graphics card.

According to an aspect of the present invention, there is provided a method for displaying an image portion on a display apparatus the image portion corresponding to image data created according to any of the above described methods According to an aspect of the present invention, there is provided a method for displaying an image segment on an autostereoscopic display apparatus, the autostereoscopic display apparatus comprising an array of apertures and an imaging portion, the image segment comprising a perspective view of a 3D scene, the perspective view created for a particular aperture by a projection of a plurality of item coordinates of at least one item in the 3D scene onto a projection plane and a transformation of the item coordinates; the method comprising displaying the image segment on the imaging portion at a location adjacent the particular aperture.

According to an aspect of the present invention, there is provided a method for displaying a plurality of image segments on an autostereoscopic display apparatus, the autostereoscopic display apparatus comprising an array of apertures and an imaging portion, each image segment comprising a perspective view of a 3D scene, the perspective view created for a particular aperture by a projection of a plurality of item coordinates of at least one item in the 3D scene onto a projection plane and a transformation of the item coordinates; the method comprising displaying an image segment on the imaging portion at least when the particular aperture is open and at a location adjacent the particular aperture.

According to an aspect of the present invention, there is provided a display apparatus arranged to display an image portion, the image portion corresponding to image data created according to any of the above described methods.

According to an aspect of the present invention, there is provided a display apparatus arranged to display an image segment, the display apparatus comprising an array of apertures and an imaging portion, wherein: the image segment comprises a perspective view of a 3D scene, the image segment having a first perspective in a horizontal direction corresponding to a first observation distance and a second perspective in a vertical direction corresponding to a second observation distance; and the display apparatus is arranged to display the image segment on the imaging portion at a location adjacent a particular aperture.

Preferably, the display apparatus is arranged to display the image segment on the imaging portion at a location adjacent the particular aperture when the particular aperture is open and at a location adjacent the particular aperture.

Preferably, the image segment is created for the particular aperture.

According to an aspect of the present invention, there is provided a display apparatus arranged to display an image segment, the display apparatus comprising an array of directional light filtering devices and an imaging portion, wherein: the image segment comprises a perspective view of a 3D scene, the image segment having a first perspective in a horizontal direction corresponding to a first observation distance and a second perspective in a vertical direction corresponding to a second observation distance; and the display apparatus is arranged to display the image segment on the imaging portion at a location adjacent a particular directional light filtering device.

Preferably, the directional light filtering devices are operable to allow a viewer or detector to see a different area of the imaging portion dependent upon an angle at which each directional light filtering device is observed.

Preferably, the display apparatus is an autostereoscopic display.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; and the imaging portion comprising a 2D display including a Digital Micromirror Device and an optical wedge.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; and the imaging portion comprising a Ferro-Electric Liquid Crystal Display.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; and the imaging portion comprising an Organic Light Emitting Diode display.

According to an aspect of the present invention, there is provided an autostereoscopic display apparatus comprising an array of directional light filtering devices and an imaging portion, wherein: the array of directional light filtering devices being operable to allow a viewer or detector to see a different area of the imaging portion dependent upon an angle at which each directional light filtering device is observed; and the imaging portion comprising an Light Emitting Diode display.

Preferably, the autostereoscopic display apparatus comprises a parallax barrier display or an active parallax barrier display.

According to an aspect of the present invention, there is provided an autostereoscopic display apparatus which uses time-multiplexing to display a plurality of images behind a plurality of apertures for presenting a 3D scene to an observer.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; the array of apertures comprising a plurality of sub groups of apertures, each sub group of apertures comprising a plurality of apertures arranged to be transparent simultaneously; and when an aperture is transparent an image is displayed on the imaging portion.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; and the imaging portion comprising one of the group comprising: a 2D display including a Digital Micromirror Device and an optical wedge; a Ferro-Electric Liquid Crystal Display; and an Light Emitting Diode display.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; and the imaging portion comprising a 2D display.

Preferably, the array of apertures is placed on an observation side of the imaging portion.

Preferably, the imaging portion comprises a projection apparatus and a screen. Preferably, the array of apertures is placed on a projection side of the screen. Preferably the screen comprises a vertical diffuser. Preferably the apertures are arranged with the longest dimension of at least one aperture in a vertical direction. Preferably, the projection apparatus comprises an optical wedge. Preferably, the projection apparatus comprises at least one DMD. Preferably the projection apparatus comprises a plurality of DMDs. Preferably, each of the plurality of DMD's projects a different colour onto the screen.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; and the imaging portion comprising a plurality of Digital Micromirror Devices, each Digital Micromirror Device arranged to reproduce a different colour.

Preferably, each different colour is one of the group of: red, green and blue.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; and the imaging portion comprising a 2D display having a curved imaging surface.

Preferably, the imaging surface is a screen. Preferably, the aperture array is planar. Preferably, the imaging surface is curved such that a central portion is more distant from the aperture array than either of two opposite sides. Preferably, the imaging surface is curved in a first direction and planar in a second direction. Preferably, the first and second direction are perpendicular. Preferably, the imaging portion has the shape of part of the curved surface of a cylinder. Preferably, wherein the axis of rotational symmetry of the cylinder is vertical.

According to an aspect of the present invention, there is provided an autostereoscopic display apparatus comprising an array of apertures and an imaging portion, wherein: the array of apertures comprises a plurality of switchable apertures, said switchable apertures being switchable between a substantially transparent state and a substantially opaque state; and the imaging portion comprising a 2D display having a curved imaging surface.

Preferably said image is arranged as described above.

According to an aspect of the present invention, there is provided a method of using a mathematical technique or manipulation to render an image from 3D information, wherein the image has a correct perspective for display on an autostereoscopic display apparatus.

Embodiments of the present invention provide a 3D image to a viewer which has substantially no discontinuities as viewer position changes. Embodiments of the present invention provide a 3D image to a viewer which has a correct perspective, thus providing a greater sense of realism to the viewer, and allowing for the display of complex 3D information with greater clarity that may be interpreted intuitively by a viewer.

Embodiments of the present invention provide an accurate rendering method for implementation on an autostereoscopic display apparatus, the rendering method providing a clear and accurate recreation of a 3D scene, with a reduced number of perceptible discontinuities in the observed image.

Embodiments of the present invention produce a 3D image which may be viewed by a viewer at any position within a predetermined field of view.

Embodiments of the present invention produce a 3D image which may be viewed by a plurality of viewers simultaneously, each viewer at a different position within a predetermined field of view.

Embodiments of the present invention provide a method of creating a 2D representation of a 3D scene, world, or object The 3D scene, world or object is preferably stored by a computer and is represented as a plurality of coordinates or wire frame models, and texture maps. Typically, a ray tracing method is used to generate a 2D image from the 3D scene, world, or object. This is necessary because typical display devices such as computer monitors and projectors only present a 2D image. The ray tracing method can be expressed in two ways. Applying "real world" principles to the 3D scene, one can imagine a virtual camera being placed in the 3D world and then light rays from each object in the 3D world being traced to the camera. The camera is virtual, so instead of placing a virtual detector device behind a lens of the camera (e.g a CCD of a conventional camera), we can place a detector in the form of a projection plane in front of the camera. The image produced by rays crossing the projection plane is then our 2D image of the 3D scene, world or object.

A more pragmatic explanation is that the ray tracing method is simply a series of calculations performed by a computer; performing the highly complex task of translating the 3D scene, world or object into a 2D image for display.

Embodiments of the present invention provide a method of creating images of a 3D scene, world or object which, given the position of one virtual camera, produce a plurality 2D images having different perspectives, each of the perspectives tailored to a part of an autostereoscopic display apparatus. This is necessary to provide a viewer with a correct 3D perspective in both horizontal and vertical directions, such that the brain of the viewer is tricked into perceiving 3D when in reality only a plurality of 2D images are displayed.

In embodiments of the present invention a projection step or projecting step is performed; this may also be described as a step in which a projection is calculated. This calculation is dependent on the geometry of the system, such as, for example, how far away a viewer is likely to be from a display apparatus, or a typical viewing distance. Similarly, a transformation step or transforming step is performed, which is a step in which a transformation is calculated, which again is dependent on the geometry of the system.

A display apparatus capable of displaying three dimensional (3D) images is based upon the principle of using a two dimensional (2D) display surface in conjunction with an optical mask or parallax barrier comprising a plurality of optically bistable apertures that switch between transparent and opaque.

A rendering method renders images to display on the display apparatus so as to produce a 3D image for a user. The rendering method is particularly suited to computer generated (e.g. animation or 3D games) or computer processed (e.g. medical imaging or geological survey imaging) 3D image information. The rendering method requires both a projection step to generate a 2D representation or perspective view of a 3D scene, and a transformation step to provide a corrected perspective to a viewer when the display is observed from an observation distance.

Two embodiments of the rendering method will be described in detail, these are: Camera in shutter plane; and Camera in viewing plane. The present invention is not limited to these two embodiments.

A feature of embodiments of the present invention is rendering an image using a camera at either an aperture position or an observation position. A transformation is then performed on rays that intersect a projection plane to compensate for the distorted perspective. These transformations are dependent on the object position in the viewing volume. The transformed image is displayed on a screen behind an aperture of a parallax display as part of a 3D display system.

For the x-coordinate, the projected x-coordinate ($x_p$) is translated to compensate for the different camera position. Further, the viewing angle of the camera in the aperture position is broadened in order to capture the entire frustum of the camera in the observation position.

For the y-coordinate a similar problem is encountered as for the x-coordinate—namely that the frustum of the camera in the aperture position fails to capture the entire frustum of the camera in the observation position. To overcome this problem a different solution is applied, that of translating the object coordinate in the y direction and projecting the translated object coordinate onto the projection plane to generate the final projection coordinate.

Some embodiments of the present invention will now described by way of example with reference to the accompanying drawings in which.

Figure 1:
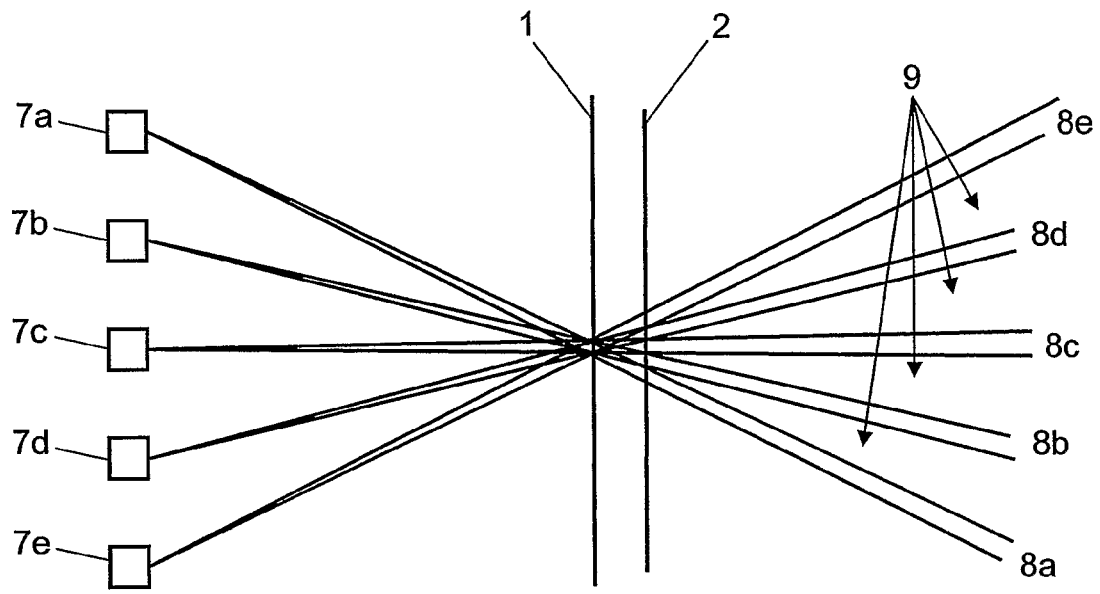
FIG. 1 illustrates a problem with a conventional rendering method.
Figure 2:
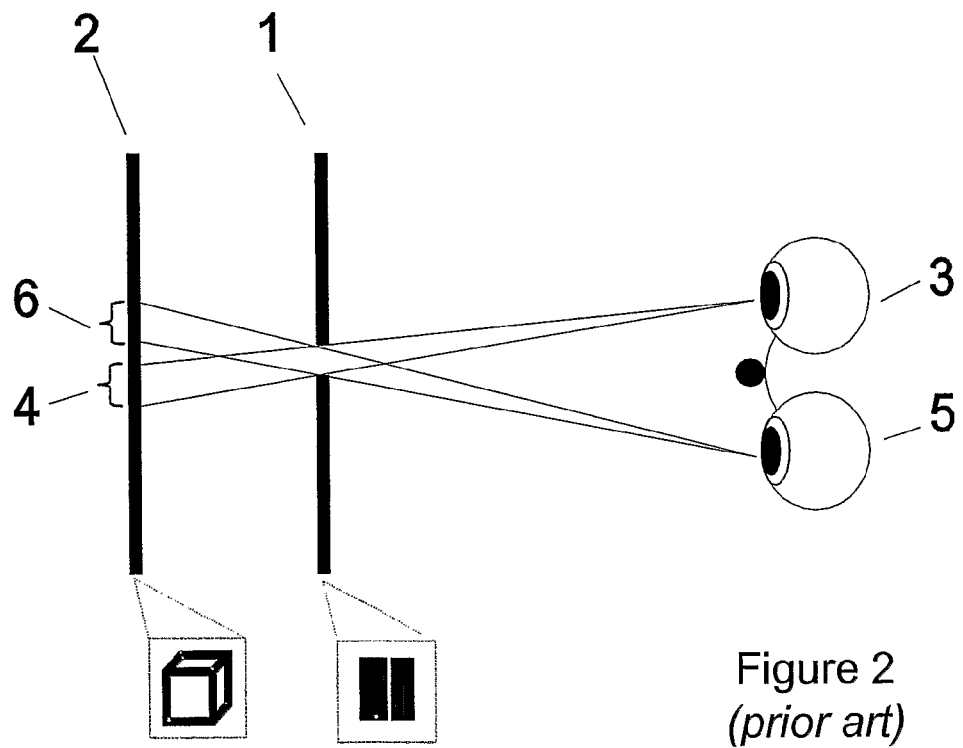
FIG. 2 illustrates the fundamental principle behind 3d parallax barrier displays.

Embodiments of the present invention provide a three dimensional display which comprises a display, a shutter placed between the display and the viewer, and control electronics for synchronizing the image shown on the display with the position of the shutter so that the viewer sees a three dimensional image.

First, we will discuss an apparatus embodying the present invention, primarily concerning the projection system and optical arrangements required. Secondly, we will discuss how images are created for display on an autostereoscopic apparatus, including two methods embodying the present invention.

A three dimensional (3D) continuous motion experience is created by displaying multiple perspectives of each frame of a moving scene, such that for each frame, each eye of the viewer sees a different perspective image. This can be achieved by placing an optical mask, comprising a plurality of shutters, between the viewer and the screen. The position of the mask will typically be close to the screen, but this depends on, for example, the shutter width, and number of shutters etc. The mask limits the viewing area of the screen and therefore restricts what each eye of a viewer can see. The aperture is made sufficiently narrow such that each eye of a viewer sees a distinct area of the screen such that the content seen by each can be made to differ. This satisfies a key condition for the display of a 3D image.

Films, full motion video or even computer generated video all comprise a plurality of frames. A frame is a still image. A flicker free experience is created in the brain of the viewer by displaying one frame after another at a sufficiently high speed. The rate at which one image on a screen is replaced by another image is the image refresh rate. The image refresh rate is the number of frames per second displayed by the screen.

By displaying appropriate images in succession on the screen, a continuous motion experience can be created in the mind of the observer.

In the simplest arrangement the mask is configured such that it is opaque apart from one transparent aperture. A viewer may move his or her head and will see, for each eye, new, different, parts of the image appear and others disappear through the aperture. This means that as the viewer moves his head, the image seen through the aperture changes continuously allowing the viewer to look around a displayed object. The transparent aperture is then translated horizontally in synchronization with a new image being displayed on the screen. This means each image displayed on the screen has a corresponding aperture. If this process of opening the aperture synchronously with the screen refresh rate is performed sufficiently quickly, then the viewer will perceive one 3D image, since all the apertures will appear as one large transparent aperture. The 3D image will consist of many apertures each representing a portion of the entire 3D image. This may result in a discontinuity at each aperture boundary in the image, such that a viewer will experience discontinuities in the image itself. These disturbing artifacts can be removed with proper rendering.

The basic principle of the invention is to have a screen, which can be achieved via a projection engine or some other display such as a self illuminating display, synchronized with an optical mask or shutter array comprising a plurality of optically bistable apertures. As an example, one setup might include a high frame rate projector consisting of a micro display, such as DLP Technology (Texas Instruments' DMDs) or FLCDs (ferro-electric liquid crystal displays), projected onto a diffusive screen. However, any display, projection or otherwise, that can show images at the desired frame rate would suffice. For example an organic light emitting diode (OLED) or other self emissive display can be used. The desired frame rate would typically be the rate that allows images seen through each aperture to appear flicker-free. Such a refresh rate may be as low as 25 Hz although this is typically greater than 50 Hz.

Figure 3:
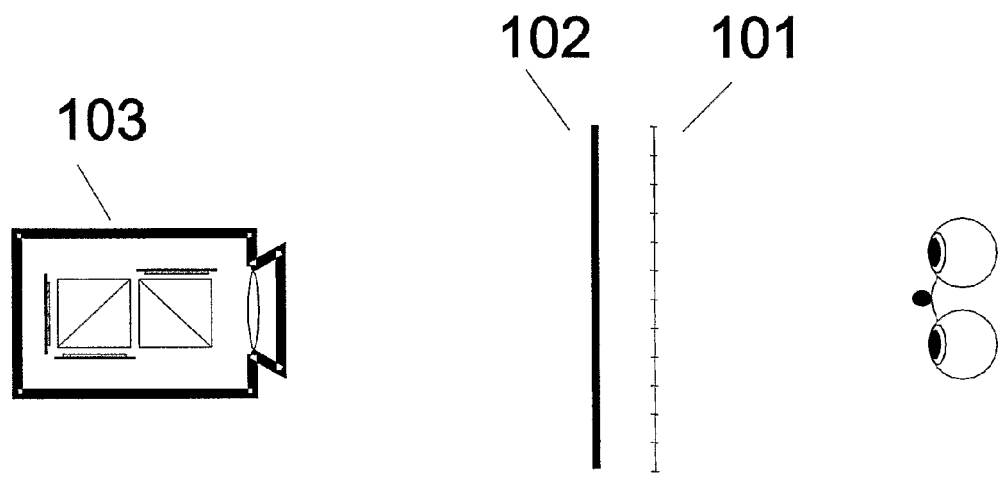
FIG. 3 shows a basic configuration comprising a projector and screen with an aperture array.

There are several possible optical configurations for embodiments of this invention. The simplest approach is shown in FIG. 3, and comprises a microdisplay with projection optics 103, a diffusive screen 102 and a mask or shutter array 101. The projector 103 and diffusive screen 102 arrangement could be achieved through either a rear or a front projection system.

Figure 4:
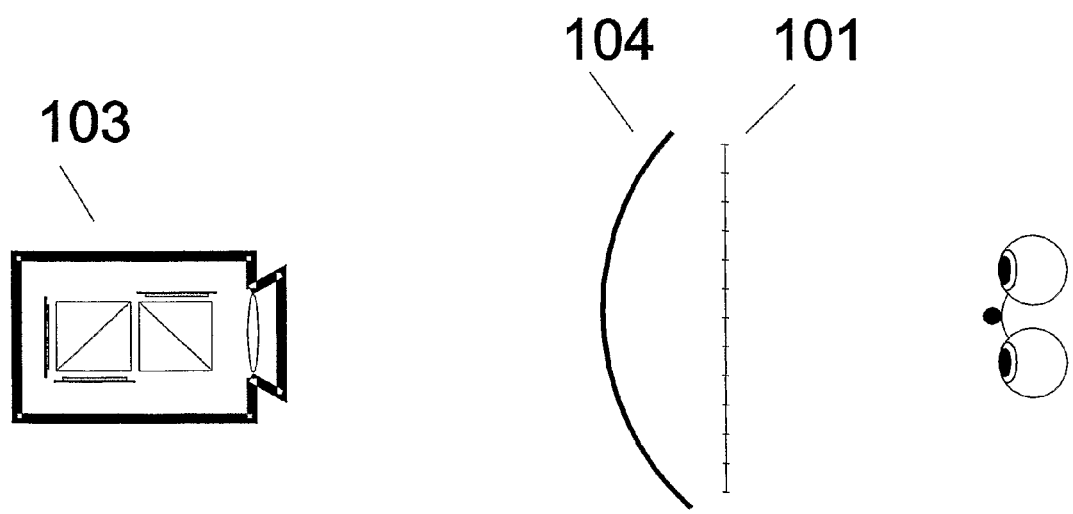
FIG. 4 shows an alternative basic configuration, comprising a curved diffusive screen.

To increase the viewing angle or visible area of the display described in relation to FIG. 3, a curved diffusive screen 104 may be used. Such an arrangement is shown in FIG. 4. Like reference numerals indicate like components. The shutter array 101 remains flat and is perpendicular to the optical axis of the projection optics. In an alternative embodiment, the shutter array could be curved. The curved diffusive screen 104 allows for a wide viewing angle, without implementing a larger diffusive screen.

Figure 5:
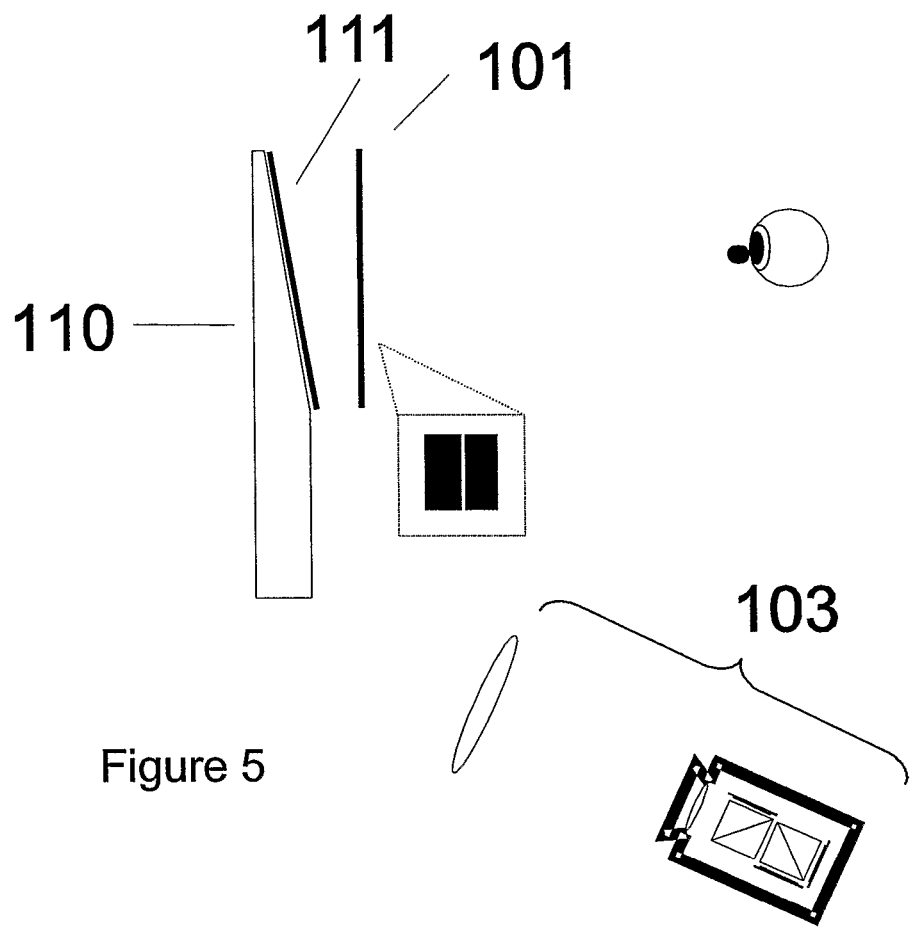
FIG. 5 shows a 3D display apparatus using an optical wedge. The image displayed on the projector will be seen on the diffusive screen, where the light exits the wedge.

Another possible setup, which would allow for a very compact system, removing the physical space required for the projection optics, is to use an optical wedge (as disclosed in U.S. Pat. No. 6,608,961). This setup is shown in FIG. 5 and has a projector with projection optics 103 that projects an image into an optical wedge 110, the image then appears at the diffusive screen 111 on the wedge followed by a mask 101 at a distance in front of the wedge's diffusive screen. Although not shown in the diagram, the mask with apertures 101 may be advantageously parallel with the diffusive screen 111.

In essence, the optical wedge has replaced the conventional projection optics and provides a flat panel display, which in turn allows for a flat panel 3D display.

Figure 6:
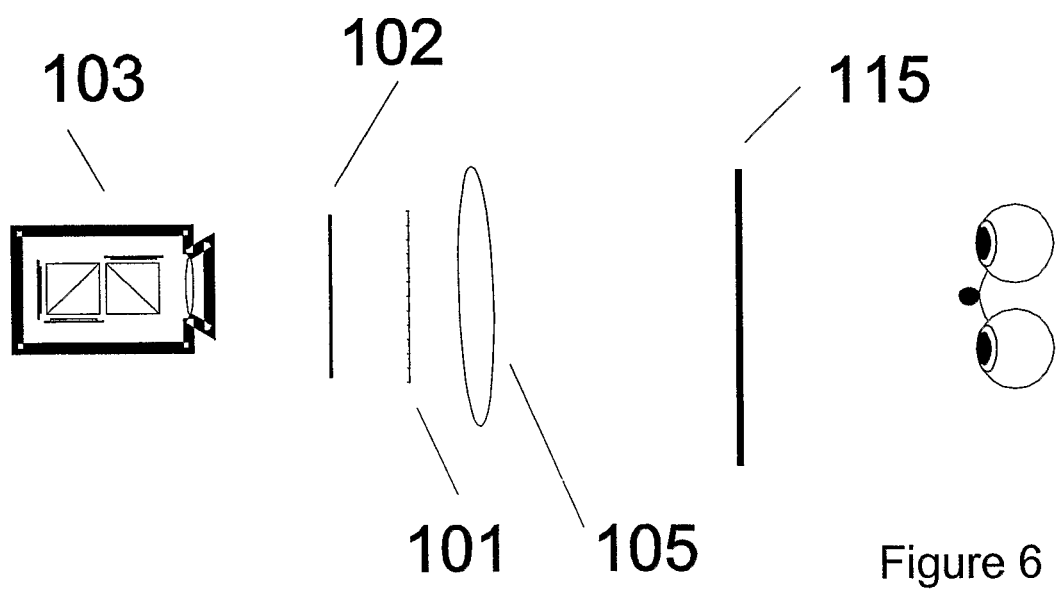
FIG. 6 shows an alternative configuration where the image and mask are magnified with a field lens. The field lens focuses the image on the diffuser onto the vertical diffuser, but the shutter array will appear behind the lens as a virtual image.

An alternative configuration is shown in FIG. 6. A projector 103 projects an image onto a diffusive screen 102. A field lens 105 focuses the image formed on the diffusive screen 102 onto a vertical diffuser, holographic diffuser or other non-linear diffusive element 115. A shutter array 101 is positioned between the diffusive screen 102 and the field lens 105. In this position, the shutter array 101 must be sufficiently close to the field lens 105 that a real image of the shutter array 101 is not formed by the field lens 105. It is necessary that the field lens 105 creates a virtual image of the shutter array 101. The shutter array 101 acts as a field stop and limits the exit pupil of the projection apparatus.

In a further alternative configuration the shutter array 101 may be orientated between the field lens 105 and the vertical diffuser, holographic diffuser or other non-linear diffusive element 115. The vertical diffuser allows the light to diffuse vertically, whilst preserving the horizontal information. The 3D principle is similar to that described above; however the front part of the display or wedge is now the diffuser and not the mask. By introducing the lens in the system the same result is achieved but with a smaller image and also a smaller mask.

Figure 7:
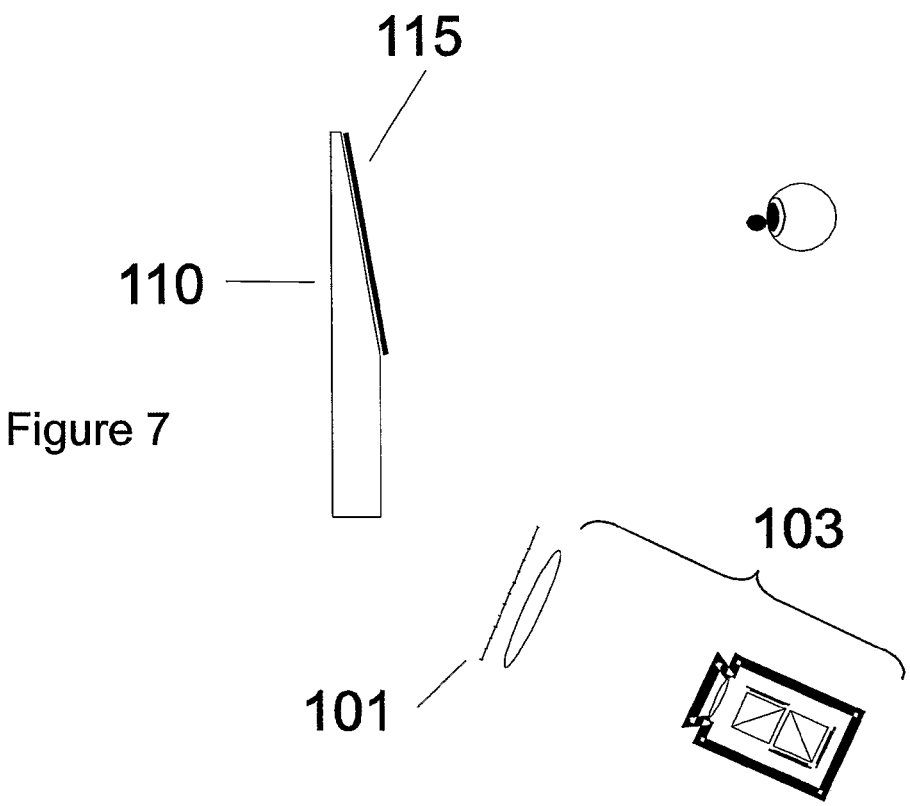
FIG. 7 shows a projector where a shutter array is placed between a projector and a wedge entrance.
Figure 8:
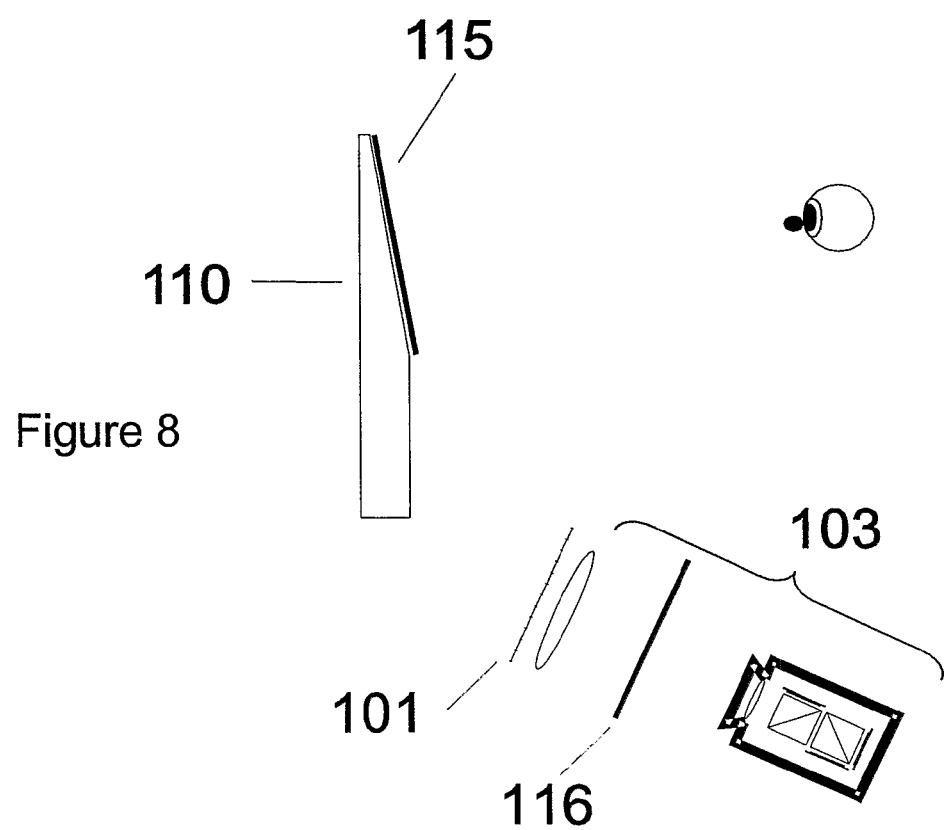
FIG. 8 shows the system of FIG. 7 with an additional diffuser placed between the field lens and the projector.

To reduce the size of the system shown in FIG. 6, the field lens 105 can be substituted with an optical wedge 110, as shown in FIG. 7. This system comprises a projector with projection optics 103, a mask or shutter array 101 and an optical wedge 110 with a vertical diffuser, holographic diffuser or other non-linear diffusive element 115. However, to increase the light cone, which in turn will increase the output viewing angle, one could place an intermediate diffuser between the projection optics and projector as shown in FIG. 8.

In the above described apparatus, the shutter array 101 is a ferro-electric Liquid Crystal Display (FELCD) having a plurality of FELCD apertures. Each FELCD aperture comprises a FELCD cell, having two transparent electrodes and a layer of ferro-electric liquid crystal disposed therebetween. The voltage between the two transparent electrodes is controlled so as to determine the polarization state of the ferro-electric liquid crystal disposed between the two transparent electrodes. The FELCD aperture further comprises a polarizing layer placed in front or behind the FELCD cell so as to cause the FELCD aperture to block or transmit light dependent upon the polarization state of the ferro-electric liquid crystal layer.

In an alternative embodiment, the shutter array 101 comprises a mechanical aperture arrangement In a further alternative embodiment, the shutter array 101 comprises a Micro Electro Mechanical (MEM) device.

Rendering algorithms for autostereoscopic displays have been researched in detail for decades. Complicated approaches have been developed to compensate for distortions inherent in all autostereoscopic systems, such as anti-aliasing, warping etc. All such approaches build on the fundamental rendering principles for autostereoscopic viewing and so first a description of the basic ideas of stereoscopy will be given.

A 3D display may be considered as a defined area through which an observer can see a 3D world, much like a window in the real world. The window analogy works well for 3D. In fact, the window may be considered as a perfect 3D display, where each point can emit a unique light ray in a specific direction. This model is only partially true to life, since light does not behave strictly as rays but has field curvature associated with it. However, for the purposes of rendering images, light can be safely treated as rays, ignoring the wave front curvature. The aim when creating a 3D display is to recreate a perfect window. Hard copy holograms have been created with such quality that a viewer can hardly believe they are 3D photos and not tangible objects. A hologram may be said to act as a window, mapping light rays and their direction to corresponding points from the window being recreated. Therefore, with sufficient quality a viewer would not be able to distinguish between a window and a 3D display. Hence the term "stereo screen" is interchangeable with "window" and both connotations are used throughout.

Embodiments of the present invention may be readily applied to the field of computer graphics in general and in particular to the rendering of a 3D image or computer generated world on a display. Such rendering is well refined and continues to develop, particularly in the art of computer games and in Computer Generated Images (CGI) used in films or movies. Such rendering typically involves placing a "virtual camera" in to the 3D environment and calculating what it can see. Such calculation generally comprises mapping points in the 3D world onto a 2D area called a projection plane which corresponds to the 2D display—typically a monitor or similar device.

Figure 9:
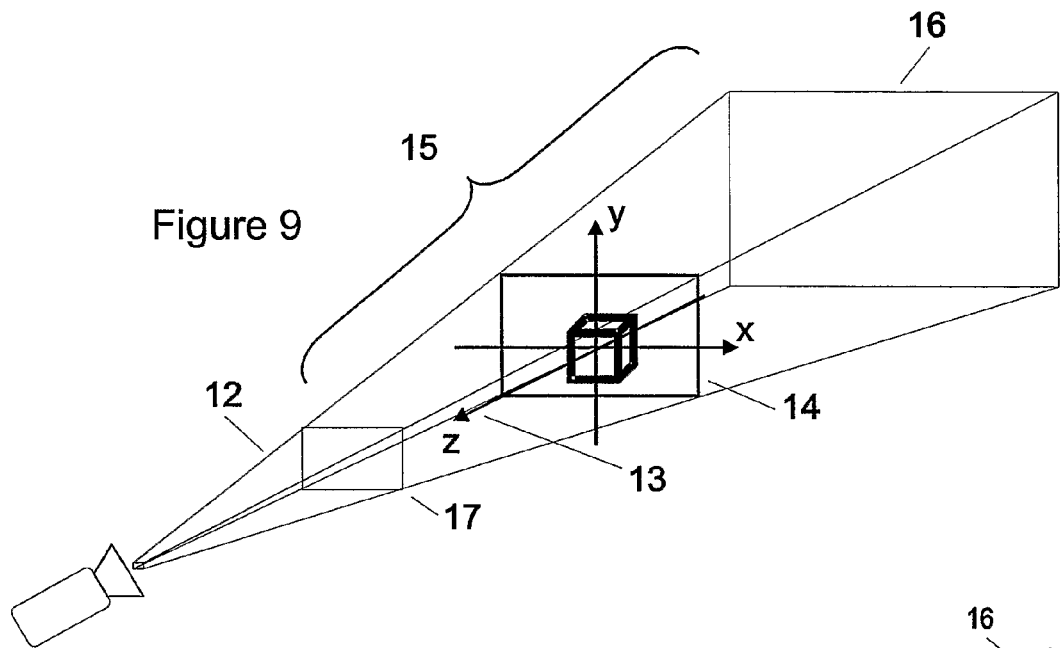
FIG. 9 shows the viewing frustum with the origin centred at the window or projection plane.

FIG. 9 shows a camera 11 which captures light rays from objects in the field of view, which is typically a pyramid 12. The pyramid 12 has a rectangular cross section. The pyramid 12 and the field of view extend to infinity. The origin of the coordinate system is defined as the point at which the optical axis 13 of the camera intersects the projection plane 14. The optical axis 13 is coincident with the z-axis, which has a positive direction into the camera. This is a common notation in computer graphics literature and so the same or similar coordinate system and notation will be used herein.

A viewing frustum 15 is defined as a portion of the pyramid 12 lying between a front and a back clipping plane. Objects between the front clipping plane 17 and the camera are ignored by the camera; that is, deemed to be transparent such that objects behind, in the volume on an opposing side of the front clipping plane, are recorded by the camera. Objects in the volume on a side of the back clipping plane 16 distant to the camera are also ignored by the camera in order to reduce the amount of calculation required by a processing apparatus such as a graphics card. The volume seen by the camera is the volume inside the frustum and may also be referred to as the viewing volume. This is a practical limitation used to reduce the amount of calculation required. The front clipping plane 17 is provided to prevent one near object from consuming the entire display. The front clipping plane 17 sets a maximum distance towards the camera.

For simplicity in the analysis below, the front clipping plane 17 and the projection plane 14 are coincident. This allows us to ignore the front clipping plane 17 and to only project objects on one side of the projection plane 14.

Finally, the vertical viewing angle along the y-axis is defined as the angle between the z-axis and one side of the frustum or pyramid 12; this is the field of view, $\theta$ (theta). The horizontal viewing angle along the x-axis is defined as the angle between the z-axis and one side of the frustum or pyramid 12. The viewing angle along the x-axis may also be derived from the aspect ratio of the image or screen, which is the width in a direction perpendicular to the x=0 plane divided by the height in a direction perpendicular to the y=0 plane of the projection plane 14.

Figure 10A:
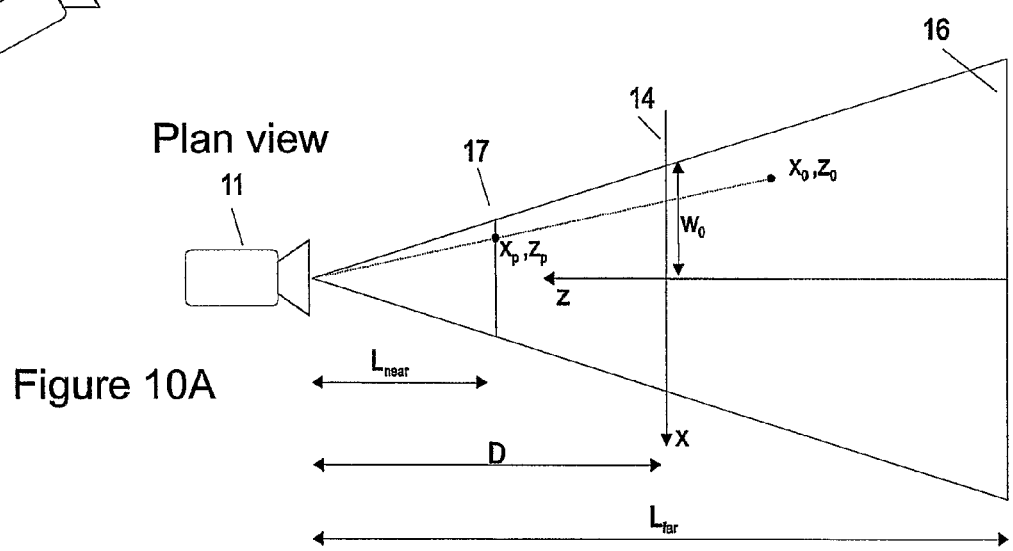
FIG. 10A and FIG. 10B show a plan and side view respectively of the arrangement shown in FIG. 9.
Figure 10B:
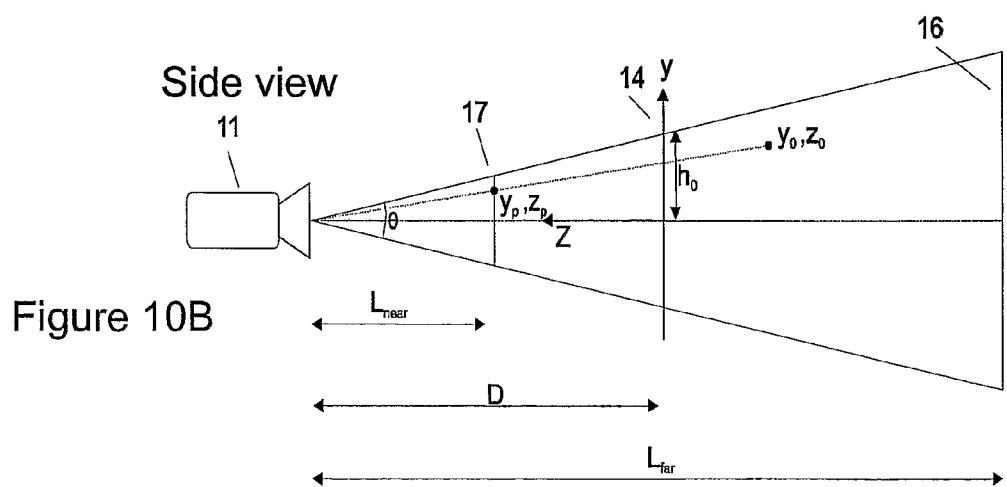

FIG. 10A shows a plan view of the illustration in FIG. 9, in the y=0 plane. FIG. 10B shows a side view of the illustration in FIG. 9, in the x=0 plane. The front clipping plane 17 and projection plane 14 are coincident and are shown at a distance D from the camera. The rear clipping plane is shown at a distance $L_{far}$ from the camera. The projection plane has a width $2w_0$ in the x direction and a height $2h_0$ in the y direction. An object position $(x_o, y_o, z_o)$ is projected onto the projection plane 14 at a projection coordinate $(x_p, y_p, z_p)$.

For a camera to record the same image as a human eye it cannot simply rotate around an axis centred on the display plane. Such a rotation introduces unwanted vertical parallax and produces what is known as keystone distortions. The camera must be located along a line parallel to the display, and must not rotate, since this will introduce vertical parallax and keystone distortions.

Figure 11:
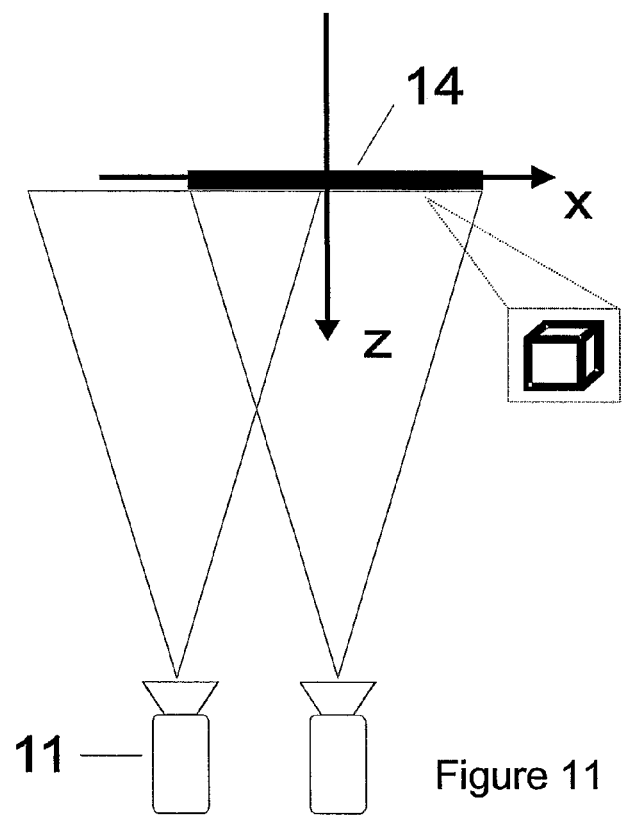
FIG. 11 shows two cameras with normal symmetric viewing frustums.

Correct camera movement is along a straight track with the optical axis constantly perpendicular to the window plane. However, this alone will not give the right perspective as FIG. 11 shows. Translating the camera 11 is equivalent to shifting the object. If one captured several such images by translating only the camera and displayed them on a 3D display, a viewer would see the object translate as the head position changed. Obviously this is not what one would see in the real world, when for example looking through a window, and therefore is wrong. The question on how to render correctly can be answered by looking at what is actually focused on the retina of a viewer's eye. The off-axis camera will only capture a part of the 3D scene seen through the window.

The image that forms on the retina is a perspective projection with a shear applied to it. For a camera this would be equivalent to placing a translated lens in front of the camera entrance pupil. The shear lens performs a translation and ensures that the image formed on the film plane is completely illuminated. In reality, using a shear lens introduces severe aberrations due to optical non-paraxial properties of these lenses. These aberrations severely limit the usefulness of such an approach. Also, the mechanical difficulties of implementing a shear lens are substantial.

Figure 12A:
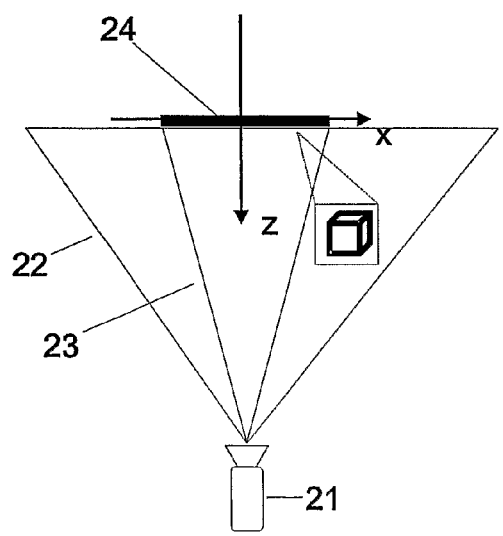
FIG. 12A and FIG. 12B show a camera with a wide viewing frustum, which is cropped so as to effect a shear transformation.
Figure 12B:
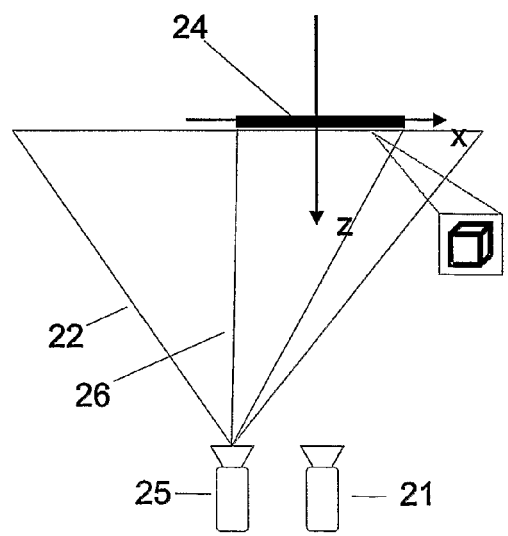

One way of achieving the same result for a standard camera is to use image clipping. FIG. 12A and FIG. 12B show a camera setup with a wide field of view. In FIG. 12A, a camera is positioned on the z-axis at position 21; the camera has a wide field of view 22 but only the centre part 23 of the captured image will contain information about the 3D scene of interest 24. By clipping away both sides of the captured image from view 22, the remaining image would be the desired central 3D scene 24.

In FIG. 12B, a camera is off axis at position 25, with the same symmetric field of view 22, but of course in a different position. Camera position 21 is shown for reference. As before, the camera captures a large region with only a certain portion containing information about the 3D scene of interest 24. If we clip the image so that only the desired region 26 is present the result will be equivalent to that of using a shear lens.

This approach does have its limitations, since the 3D region becomes very small for large viewing angles. When the camera is translated far off axis a large viewing angle is needed to capture the 3D window and therefore the useful region becomes proportionately small. For computer systems this is not a problem since it is possible to simply scale the useful region. For real life captured images this is a limiting factor.

The basic mathematics involved to implement perspective rendering in a computer graphics system will now be described, using the same notation and model as above, wherein the camera looks down the negative z-axis.

Figure 13A:
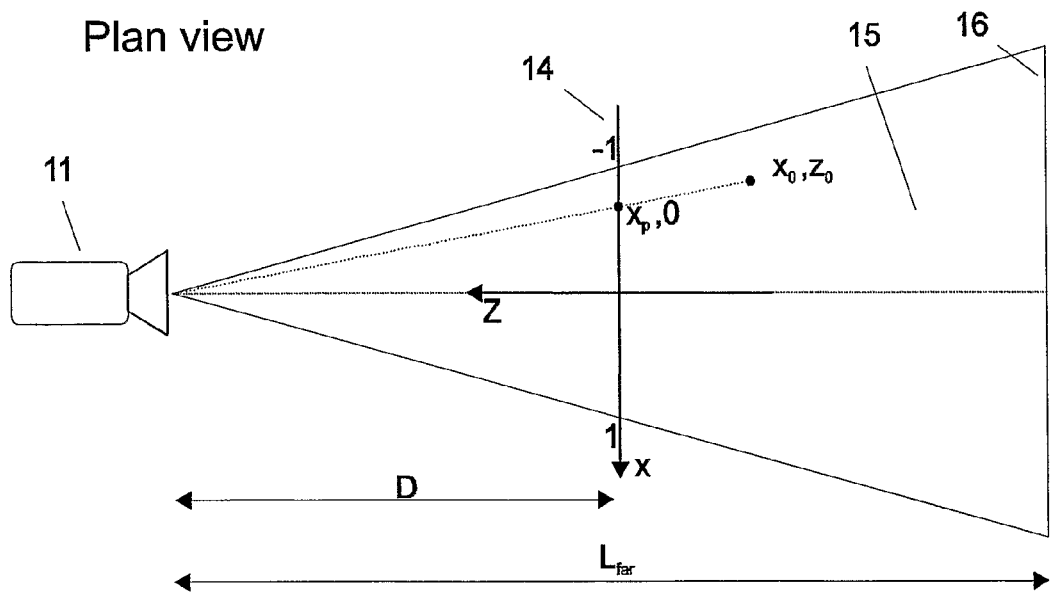
FIG. 13A and FIG. 13B show a simplified projection model for the x=0 and y=0 planes.
Figure 13B:
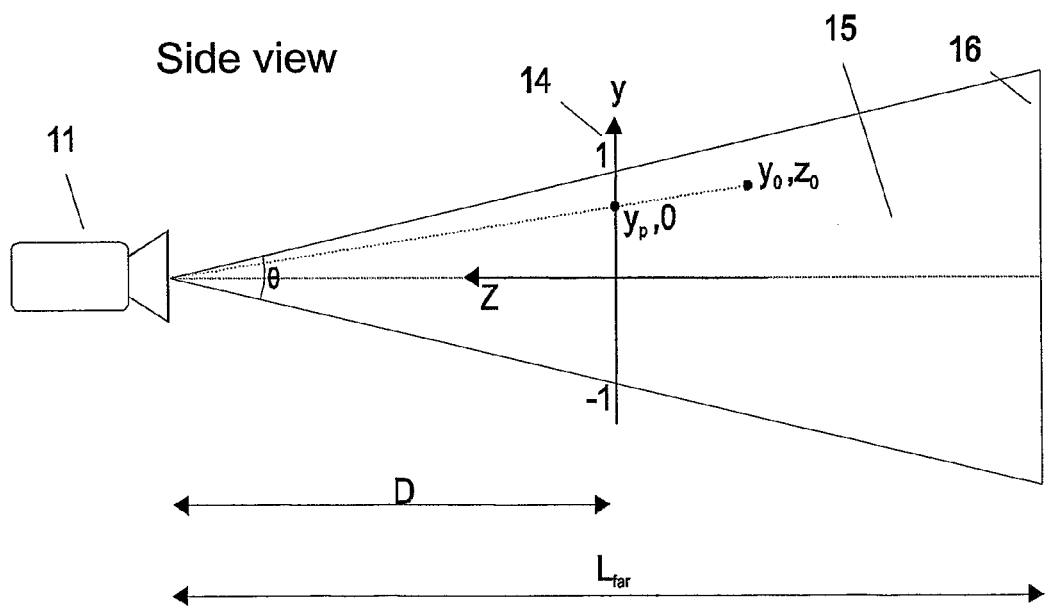

FIG. 13A and FIG. 13B show a simplified projection model for the x=0 and y=0 planes where the front clipping plane 17 is coincident with the projection plane 14. A pixel coordinate $(x_p, y_p, z_p)$ is independent of the position of the projection plane 14. FIG. 13 shows how the projection coordinate $(x_p, y_p, z_p)$ of where an object point $(x_o, y_o, z_o)$ in the frustum projects on the projection plane 14 can be calculated. This is equivalent to finding where the light ray from the point $(x_o, y_o, z_o)$ that travels to the camera 11, intersects the projection plane 14. The projection plane 14 may be spatially separated from the front clipping plane 17. Where the front clipping plane 17 and the projection plane 14 are not coincident, the projection plane 14 can be located anywhere along the pyramid 12 between the camera 11 and the front clipping plane 17.

Projection coordinates are device independent and vary from −1 to 1 where 0 is the centre of the projection plane. The coordinates −1 and 1 coincide with opposing sides of the pyramid 12. This device independent coordinate remains constant even if the projection plane 14 is moved to a different position along the z-axis. Only when specifying the window size in terms of number of pixels does a point on the projection plane 14 map to a pixel coordinate on a physical display device.

In FIG. 9, the projection plane is shown in between the front and back clipping planes, 17 and 16 respectively. An embodiment will be described below in which the front clipping plane 17 and the projection plane 14 are spatially coincident in order to simplify the mathematics. Embodiments of the present invention are equally applicable to situations wherein the front clipping plane 17 and projection plane 14 are not coincident. The projection plane 14 is a construction that enables the calculation of pixel coordinates and as such its position within the system is not critical.

From FIG. 13 and using equal triangles the equations for $x_p$ and $y_p$ are as follows:

$$x_p = \frac{Dx_0}{D - z_0}$$

$$y_p = \frac{Dy_0}{D - z_0}$$

A light ray travelling from point $(x_o, y_o, z_o)$ will intersect the projection plane 14 at projection coordinates $(x_p, y_p, 0)$. The screen 2 of the 3D display apparatus comprises a plurality of pixels. The screen has $N_w$ pixels along a width in the x direction and $N_h$ along a height in the y direction. In FIG. 10, the projection plane or window size was defined in terms of w and h. The aspect ratio is thus:

$$A_0 = \frac{N_w}{N_h}$$

$$A_0 = \frac{w_0}{h_0} = \frac{w_0}{D\tan\left(\frac{\theta}{2}\right)}$$

The pixel coordinates have the origin in the top left corner and the bottom right pixel as coordinate $(N_w, N_h)$, as viewed from the camera position 11, in the negative z direction. The pixel coordinates $(x_{pix}, y_{pix})$ at which a ray from an object intersects with the window is thus:

$$x_{pix} = \left(1 + \frac{x_p}{w_0}\right) \times N_w$$

$$x_{pix} = \left(1 + \frac{x_0}{(D - z_0)A_0\tan\left(\frac{\theta}{2}\right)}\right) \times N_w$$

$$y_{pix} = \left(1 - \frac{y_p}{h_0}\right) \times N_h$$

$$y_{pix} = \left(1 - \frac{y_0}{(D - z_0)\tan\left(\frac{\theta}{2}\right)}\right) \times N_h$$

Figure 14:
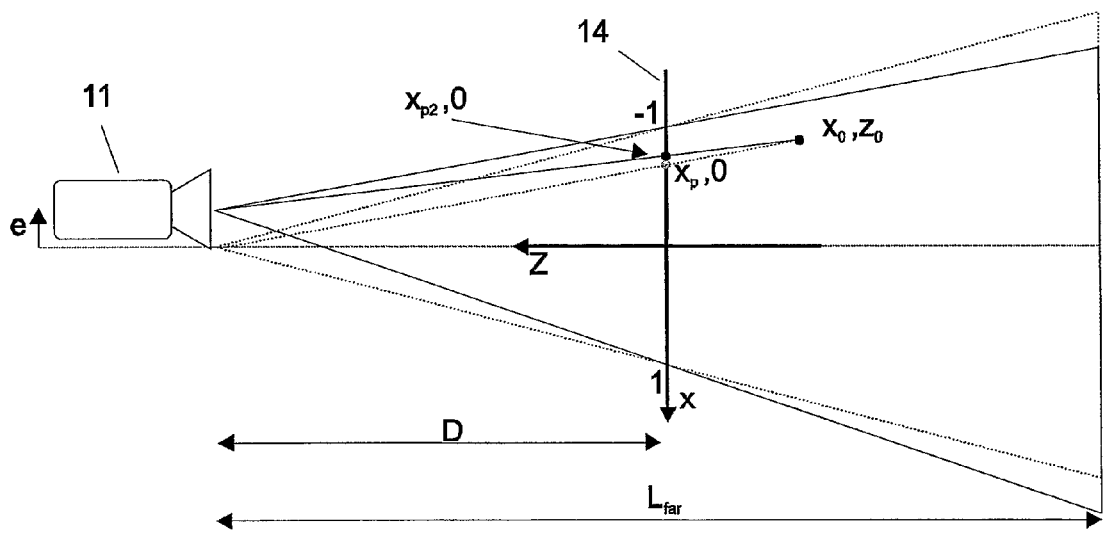
FIG. 14 shows a camera translated in the negative x direction by a distance e.

With the equations for mapping a ray to a specific pixel now derived, we will turn to see how these equations change when the camera is translated with a shear translation. As mentioned before, a shear translation requires that an asymmetric frustum must be used which must intersect the original frustum at exactly the same coordinates −1 and 1 on the projection plane. FIG. 14 shows a camera translated in the negative x direction by a distance e which introduces asymmetry to the frustum and shifts the originally projected projection coordinate $x_p$ to $x_{p2}$. Using equal triangles:

$$\frac{x_{p2} - e}{D} = \frac{x_0 - e}{D - z_0}$$

$$x_{p2} = \left(\frac{x_0 - e}{D - z_0}\right) \times D + e$$

So when the camera has been translated distance e with a shear the new projected coordinate is $x_{p2}$. Mathematically, and ignoring lighting effects, there is no difference to the end result between translating the camera and translating the object. The end result being calculation of a projection coordinate.

Figure 15:
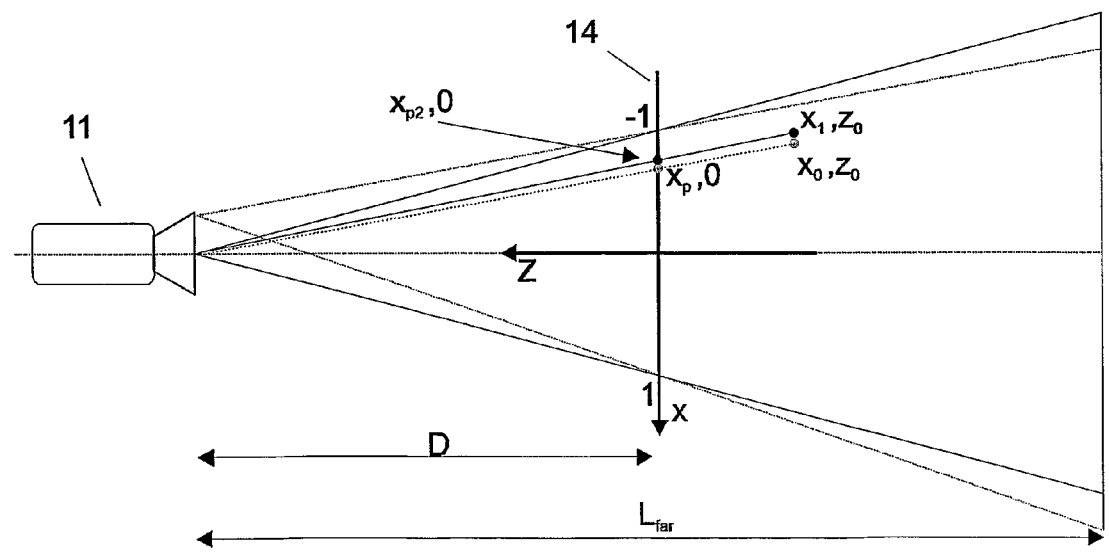
FIG. 15 shows an alternative embodiment to FIG. 14, wherein the camera remains at point (0, 0, D) and the point $(x_o, y_o, z_o)$ is translated prior to projection on to projection plane.

In an alternative embodiment, the camera remains at point (0, 0, D) and the point $(x_o, y_o, z_o)$ is translated prior to projection on to projection plane 14 such that the projection coordinate is the same value of $x_{p2}$ as above where the camera is translated to (−e, 0, D). Object position $(x_o, y_o, z_o)$ is translated to $(x_1, y_1, z_o)$, prior to projection. This is shown in FIG. 15, from which we see:

$$x_1 = \frac{(D - z_0)x_{p2}}{D}$$

substituting for $x_{p2}$ from above:

$$x_1 = x_0 - \frac{ez_0}{D}$$

This equation gives the new x coordinate $x_1$ required in order to shift the object point such that upon projection, the projection coordinate is the same as that of a camera shifted along the x direction by e. Application of this equation translates each point proportionally to the distance away from the window. So for a point in the plane of the window, $z_o=0$, and the translation operation will cause no change in the coordinates of the object position. This result may be better understood with the window analogy: a spot on the glass of a window would not move with a variation in observation position. We would, however, expect an object behind (or in front) of the spot to shift proportional to how far away from the window it was located; as the translation equation above describes.

So far we have only considered horizontal parallax systems and therefore the projected y coordinate remains the same as before. If we were to have a full parallax system, where 3D may be observed regardless of the orientation of a viewer (much like a glass window) then the same analysis would be applied to $y_o$. Further, the analysis derived so far has assumed that the viewer will be positioned at the same location as the camera.

Normally in a 3D computer graphics environment objects are built up of polygons where each corner of a polygon is called a vertex and is defined as a position in space given by (x, y, z). The vertices are stored in a vertex array through which matrix multiplications allow simple transformations such as, for example, rotation or translation. However, in the equations above for the calculation of the projection coordinates $x_p$ and $y_p$ there is a divide by $z_o$ operation. This is a non-linear function and cannot easily be implemented using matrices of rank 3, since matrix manipulations are linear operations. In order to overcome this problem, and to allow for perspective division, computer graphics systems increase the range space by 1 giving an affine transform, which is a 4×4 matrix of rank 4. The point (x, y, z) becomes:

[x,y,z,w]

where w is a constant normally set to 1.

To implement equation $$x_1 = x_0 - \frac{ez_0}{D}$$

using matrix notation, a perspective matrix is implemented:

$$[x_1, y_1, z_1, 1] = [x_0, y_0, z_0, 1] \times \begin{bmatrix} 1 & 0 & 0 & 0 \\ 0 & 1 & 0 & 0 \\ \frac{-e}{D} & 0 & 1 & 0 \\ 0 & 0 & 0 & 1 \end{bmatrix}.$$

The perspective matrix will be multiplied with the projection matrix, which is applied after model and lighting transformations in the graphics pipeline.

The equations derived above ignore perspective projection, which is implemented in a graphics pipeline of a graphical processing unit. The above equation is a linear equation and may be readily implemented using matrix algebra such as is common in a graphical processing unit. The model assumes that the eye position of a viewer is located where the virtual cameras are placed. In other words, the model assumed that the 3D display geometry matched that of the graphics world environment. For the scanning barrier 3D display apparatus this is not the case. The 3D display system requires more complicated rendering, since a viewer will see through several apertures at the same time.

Two known approaches described in relation to prior art parallax barrier systems are stationary barriers and scanning barriers, both of which entail slicing and multiplexing of perspectives. The inventor believes this is an unnecessary compromise. However, before describing the novel and proper mathematical description for rendering 3D perspectives for the scanning parallax barrier display of the present invention, it will be beneficial to describe these previous approaches. It will be seen that these approaches do not suffice to describe a window in its entirety, and as such are only provide approximations to a 3D scene.

The first known approach to be described is normal rendering with multiplexed perspectives. This is the most common approach, and by far the most reported. In this approach, a plurality of perspectives are captured in a normal manner as above and then slices of the different perspectives are multiplexed such that a portion of each image is seen through the correct aperture. This may be referred to as the slice and dice method.

The second known approach to be described is that of normal rendering through a virtual aperture. This approach requires an image to be captured through a virtual aperture, and requires a highly optimised and accurate rendering model. This approach captures a 3D perspective as described above, but rather then having a frustum that covers the entire window, a virtual aperture limits the aperture or the frustum to only cover the desired aperture. Then, by moving the camera slightly it is possible to capture new parts of the scene as viewed through the aperture.

Figure 16:
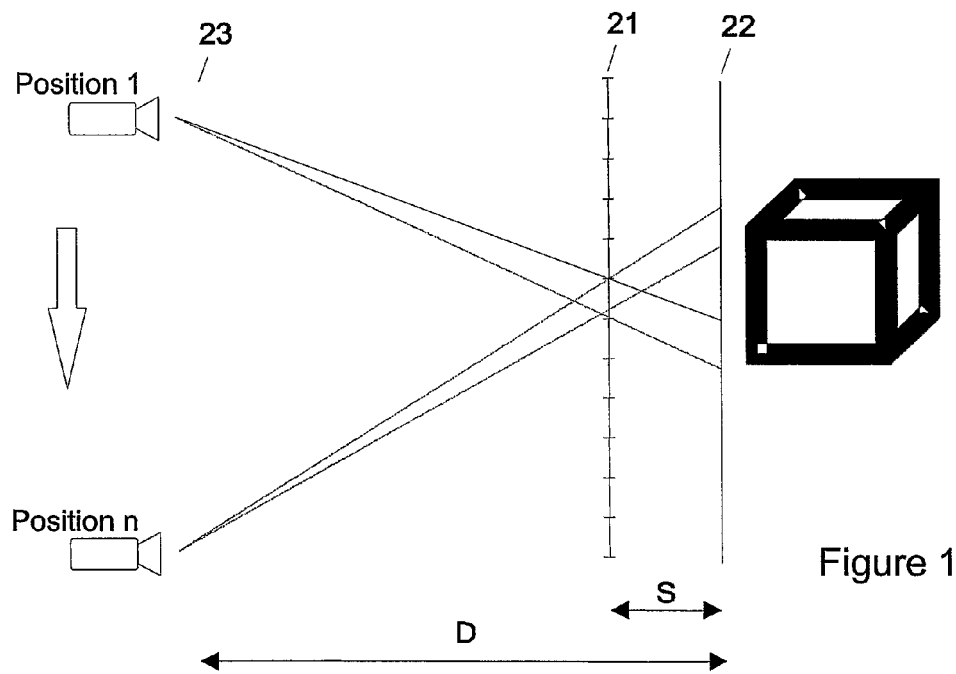
FIG. 16 shows how to capture a scene through a virtual aperture. The camera moves until a new region is visible and stores it as a portion of the entire scene.

FIG. 16 illustrates the virtual aperture approach. Virtual aperture array 27 comprises 12 virtual apertures, and is separated a distance S from projection plane 28. Camera plane 29 is separated a distance D from projection plane 28 and comprises n camera positions. Aperture number 6 of virtual aperture array 27 is shown as open with light rays passing therethrough from camera position 1 and camera position n. The virtual aperture array 27 is placed at a distance S away from the projection plane 28; at a position substantially identical to the physical shutter array 1 and screen 2 separation. This approach requires that one defines the allowable viewing box, which will equal the distance between the outermost camera positions, which in this example is position 1 and n. Similarly, an optimum viewing distance is defined as the distance D from the stereo plane to the camera position.

The capturing process starts with the opening of virtual aperture number 1. The camera, which starts in camera position 1, captures a first visible region of the scene which is visible through aperture number 1. The camera then moves to position 2, where a second visible region of the scene is visible through aperture number 1. Each visible region of the scene preferably comprises $1/N^{th}$ of the total scene visible through the window. This process is repeated until the camera reaches the end of the viewing box. The next step is to multiplex the first to $N^{th}$ regions. All the captured regions are multiplexed side by side to construct one complete multiplexed image for aperture number 1. The multiplexed image for aperture number 1 is displayed on screen 2 when a corresponding actual shutter 1 is opened. Actual shutter number 1 is a shutter on aperture array 1 having a size and position corresponding to that of the virtual aperture number 1 in the virtual aperture array 27.

The above process is repeated for all apertures in the virtual aperture array 27. If the image capturing process is performed sufficiently accurately, then all the captured regions align seamlessly in the multiplexed image. In practice, however, this is difficult to achieve and there are typically discontinuities in the seams of the captured regions.

The number of camera positions, n, required is governed by the width of each aperture in the virtual aperture array. The narrower the aperture, the more camera positions are required since the region seen through the aperture is proportionally small.

There is redundancy in the last process, since it should be possible to sweep the cameras across the viewing box once only, since no new information appears in the stereo window. Indeed, in practice the camera will capture all regions seen through aperture numbers 1 to 12 for camera position 1. The camera would then move to camera position 2 and capture the scene through aperture numbers 1 to 12 again. Finally, when all camera positions have been recorded, the different regions can be multiplexed to produce the 12 multiplexed images for synchronised display with an appropriate shutter of the shutter array 1 open.

The difference between the above two approaches is subtle. In fact, in some cases these two approaches may produce the same result. However, these approaches are two fundamentally different ways of considering the problem. The first approach, which is typically used for lenticular displays and static parallax barriers, is a straight forward approach where the display geometry often governs the multiplexing scheme. By specifying the lenticule or barrier size along with the screen size and resolution, the multiplexing falls into place. The second approach described is, from a physical standpoint, more correct. If a window was visible purely through a narrow aperture then a viewer would see the scene as the camera does.

The two approaches described above are compromises and that they require several parameters to be known before correct rendering is possible. In prior art literature the shutter is referred to as "the scanning device", because it in effect scans the different perspectives. Although this is dissimilar to a physical window, it describes the functionality of the shutter. However, more correct is to say that the shutter acts as a filter and filters down a complex 3D scene to a 2D scene. When a narrow aperture is placed over a window, it simply describes the light field passing through the aperture. So ideally the aperture would be infinitely small and act as a pinhole. In this case the aperture only represents a single 2D pixel. A camera is only a pinhole itself and one can therefore regard an aperture as a wide angle camera.

Placing a camera so the camera pinhole matches that of the elongated aperture, the camera captures the entire light field entering through the aperture window. This recreates the light field observed through a real window, and so application of this principle in embodiments of the present invention leads to correct perspective rendering for a scanning parallax barrier display device.

The inventors have thus created two methods to simulate this using a normal camera/projection model:

Camera in shutter plane—a camera is placed in the shutter plane and then a transform is performed on the captured scene to replicate the light field from the slit in a vertical direction at the viewing distance; and Camera in viewing plane—a camera is placed in the viewing plane and then a transform is performed on the captured scene to replicate the light field from the slit in a horizontal direction at the shutter plane.

Both of these methods are physically correct and are suitable for different situations.

Camera in Shutter Plane

Figure 17:
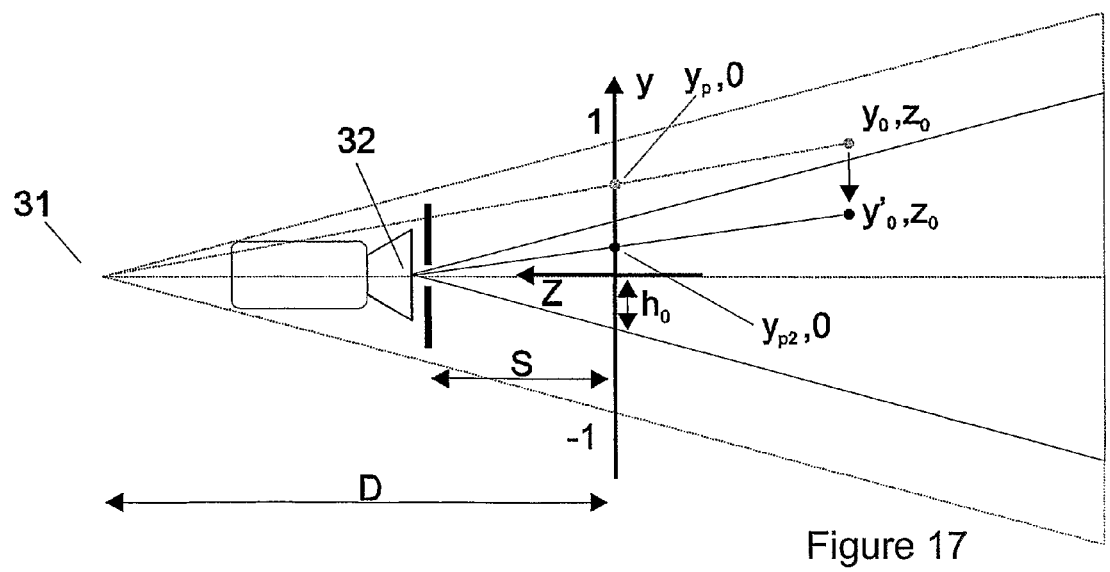
FIG. 17 shows how the projection changes as a camera is moved.

FIG. 17 shows an original camera position 31 at a distance D away from the stereo plane and a new camera position 32 where the camera is moved to an aperture plane at a distance S in front of the stereo plane. Camera position 31 is representative of one of the camera positions 1 to n shown in FIG. 16 with respect to the virtual aperture approach. A camera at camera position 31 has a projection frustum 33. A camera at camera position 32 has a projection frustum 34 which causes the object position $(x_o, z_o)$ to project to point $(X_{p2}, 0)$ which corresponds to a ray travelling through the aperture from point $(x_o, z_o)$. If one looked at the aperture one would perceive the projected point as a light ray coming from point $(x_o, z_o)$ as expected. In fact, the projection for projection frustum 34 is correct, but the coordinate system requires correction. The viewing frustum has changed and the edges −1 and 1 are no longer at the edge of the window, which is −1 and 1 at camera position 31. So point $(x_{p2}, 0)$ will be relative to the new projection frustum 34, where the new edges 1 and −1 do not correspond to the same values in the original frustum 33. The projected point must be defined relative to the display screen, because this is where it eventually will be displayed. We must account for this coordinate shift to ensure that the frustum size for a camera at position 34 equals the size of the stereo window.

Figure 18:
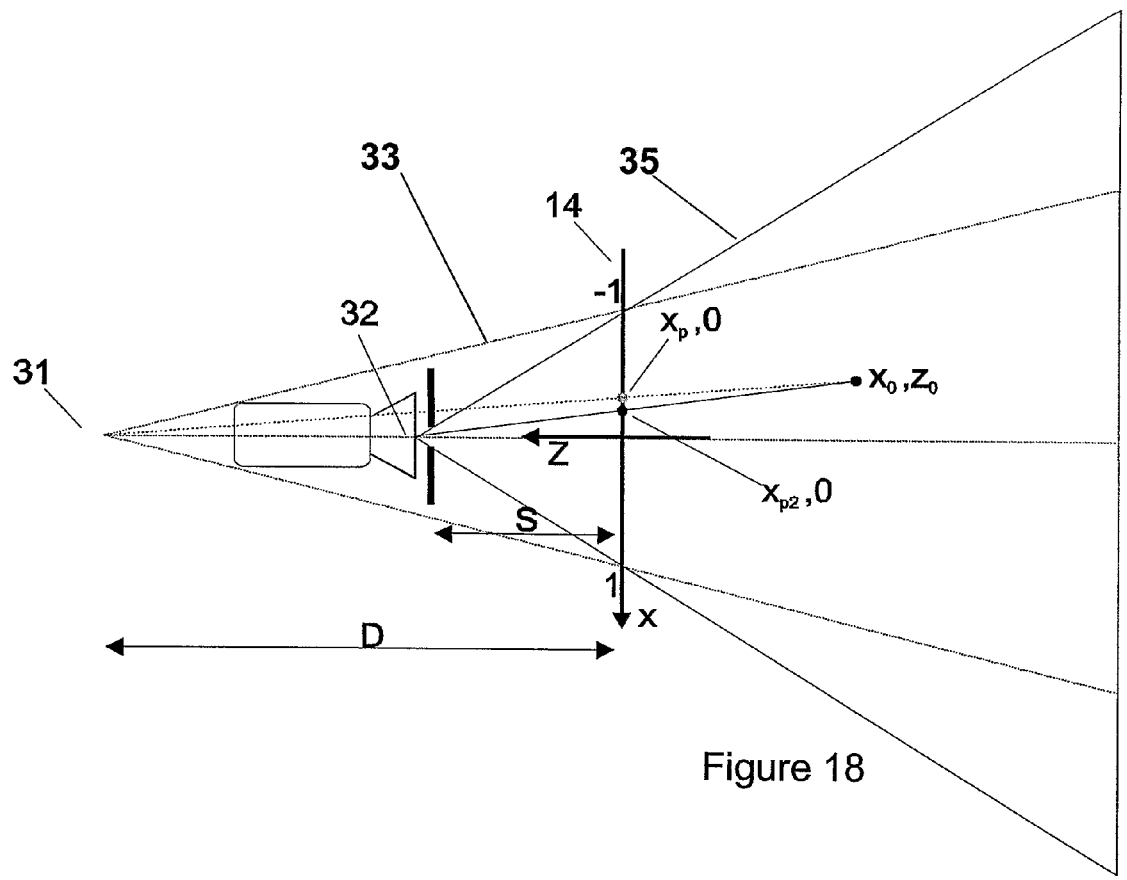
FIG. 18 shows a camera having a wide field of view.

FIG. 18 shows a camera at position 32 having a wide field of view and a new frustum 35 intersecting the points −1 and 1 of the projection plane 14. The viewing angle, i.e. the y-cone of the frustum has remained constant. However, in an alternative embodiment the aspect ratio is unchanged and the size of the frustum in the y-direction is increased. The scaling of y values would still be required. In the preferred embodiment, the frustum is only scaled along the x direction and thus changes the aspect ratio by:

$$A = A_0 \times \frac{D}{S}$$

$$A = \frac{w_0}{h_0} \times \frac{D}{S} = \left(\frac{w_0}{D\tan\left(\frac{\theta}{2}\right)}\right) \times \frac{D}{S}$$

By applying equal triangles we get the following equations for the projected point $(x_{p2}, 0)$:

$$x_{p2} = \frac{Sx_0}{S - z_0}$$

Figure 19:
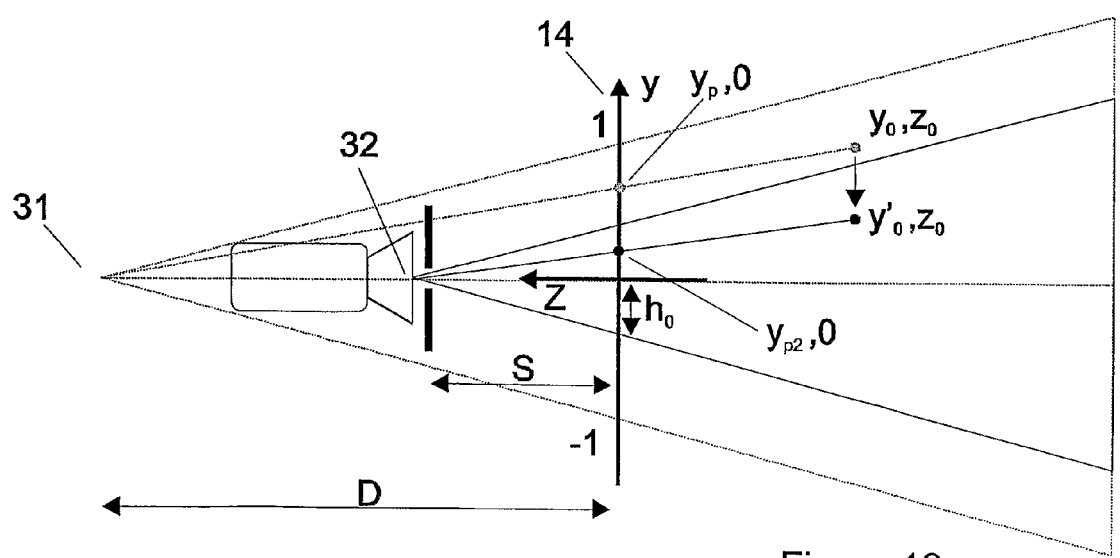
FIG. 19 shows how translating y preserves the vertical projection for a camera that has moved to a distance S in front of the stereo plane.

An observer or viewer will typically use a display with their eyes level, i.e. at the same height. Accordingly, embodiments of the present invention do not treat vertical parallax. However, when the camera is moved forward the projected y-value also changes, which ideally should remain constant. It is necessary to define an optimum viewing distance D. Because the display is horizontal parallax only, the projected y-value should remain constant as this should be independent of viewing position, i.e. the object should not change in height with head movement. FIG. 19 shows this process. Embodiments of the present invention ensure that the ratio of the distance $y_p$ to half the width of the projection plane, (i.e. 1) is equal to the ratio of $y_{p2}$ to half the width of the new projection plane. To achieve this, the point $(y_o, z_o)$ must be translated to the point $(y_o', z_o)$. By equal triangles:

$$y_0' = \left(\frac{S - z_0}{D - z_0}\right) \times y_0$$

where $y_{p2}$ is given by:

$$y_{p2} = \left(\frac{S}{D - z_0}\right) \times y_0$$

The equation for $y_{p2}$ has $z_o$ in the denominator. This non linear term causes problems with respect to the application of matrix transformations in, for example, an OpenGL pipeline. The affine transform has no way of easily implementing z division on just one of the vertex coordinates. It will, as explained, divide z through on both x and y. This new perspective division of $(D-z_o)$ must only be applied to the y value, giving rise to a non-linear function, which must therefore be implemented in a more complicated manner. This will be discussed later.

The term $(S-z_o)/(D-z_o)$ above in the equation for $y_o'$ from $y_o$ is the scaling factor.

Figure 20:
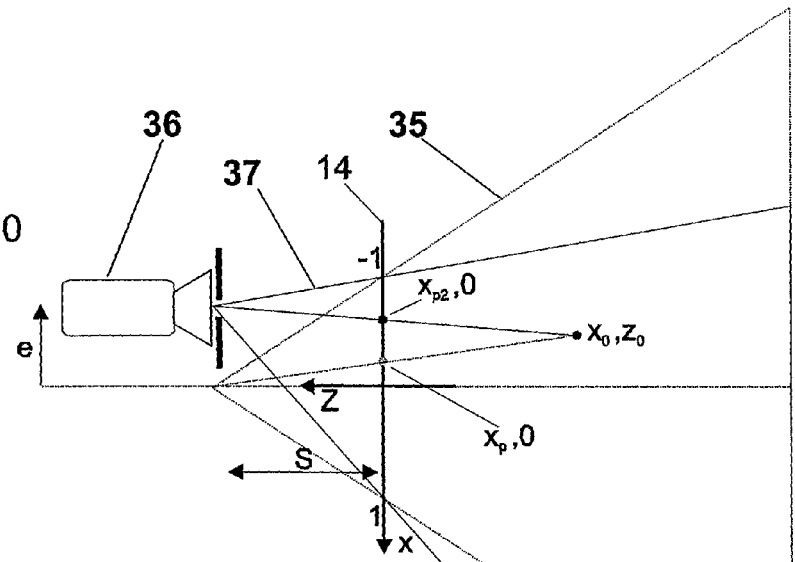
FIG. 20 shows how to calculate the projection for a camera located behind an aperture which is a distance e off the z axis in the x direction.

The new projection mathematics have now been established for a camera moved along only the z-axis, where the y-value remains constant. FIG. 20 shows how to calculate the projection for a camera located behind an aperture which is at a position 36 which is a distance e off the z axis in the x direction. Camera position 36 has a new frustum 37; old frustum 35 is shown for reference.

As shown in FIG. 20, the equation for the projection point $x_{p2}$ is:

$$\frac{x_{p2} - e}{S} = \frac{x_0 - e}{S - z_0}$$

$$x_{p2} = \left(\frac{x_0 - e}{S - z_0}\right) \times S + e$$

The equations for the projected pixel coordinate $x_{pix}$, assuming a screen size of w and pixel resolution $N_w$ may be derived from the equation above defining $x_{pix}$ in terms of $x_{p2}$:

$$x_{pix} = \left(1 + \frac{x_{p2}}{w_0}\right) \times N_w$$

$$x_{pix} = \left(1 + \frac{x_{p2}}{A_0 D \tan\left(\frac{\theta}{2}\right)}\right) \times N_w$$

Similarly, $y_{pix}$ may be defined in terms of $y_{p2}$:

$$y_{pix} = \left(1 - \frac{y_{p2}}{h'}\right) \times N_h$$

$$h' = \frac{S}{D} \times h_0$$

$$y_{pix} = \left(1 - \frac{y_{p2}}{\tan\left(\frac{\theta}{2}\right)S}\right) \times N_h$$

The pixel coordinate equations are as before since the projection plane, i.e. the window size, has remained constant. Although the window in y-direction is smaller, the equation for $y_{pix}$ accounts for this by implementing the scaling factor described above.

Figure 21:
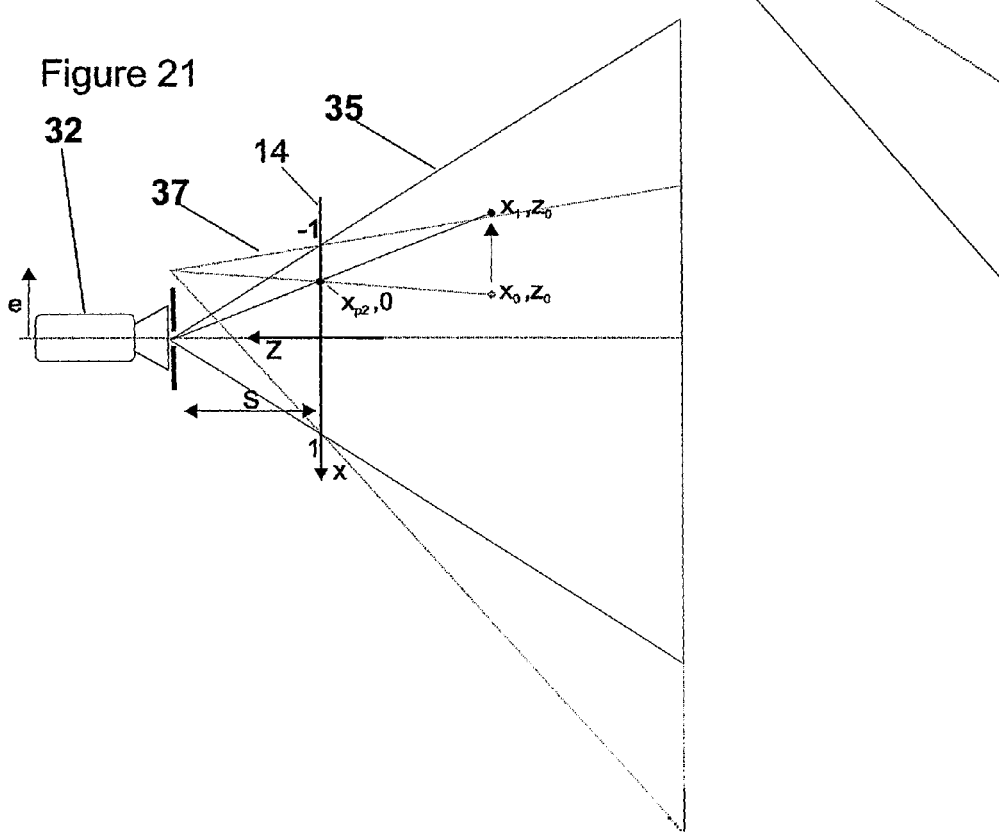
FIG. 21 shows how translating x gives a correct projection as if the camera was located at an aperture e off axis.

FIG. 21 shows how translating x gives a correct projection as if the camera was located at an aperture e off axis. A camera is shown at position 32, frustums 35 and 37 are shown.

$$x_1 = \left(\frac{S - z_0}{S}\right) \times x_{p2}$$

$$x_1 = x_0 - \frac{e z_0}{S}$$

Translating the object coordinates in this manner means that the frustum is not unnecessarily large. In the absence of object coordinate translation, as is shown in FIG. 18, in order to capture the whole clipping plane when the camera is moved forward to position 32 from position 31 the frustum must be broadened. Avoiding this broadening is advantageous in 3D scenes containing a high number of polygons, and reducing the frustum size significantly reduces the number of polygons that are processed.

Finally, the pixel coordinate must be calculated in terms of $x_o$ and $z_o$. By substituting from above we get the following equation for the x pixel coordinate, $x_{pix}$:

$$x_{pix} = \left(1 + \frac{S\left(x_0 - \frac{e z_0}{S}\right)}{(S - z_0) A_0 D \tan\left(\frac{\theta}{2}\right)}\right) \times N_w$$

Similarly for the y pixel coordinate, $y_{pix}$, is shown to be:

$$y_{pix} = \left(1 + \frac{S y_0}{(D - z_0) D \tan\left(\frac{\theta}{2}\right)}\right) \times N_h$$

These transformations implement a camera positioned at a shutter spacing having a scaled frustum and translated y coordinates. In practice, these are implemented in openGL matrix form as follows:

$$[x_1, y_1, z_1, 1] = [x_0, y_0, z_0, 1] \times \begin{bmatrix} \frac{S}{D} & 0 & 0 & 0 \\ 0 & 1 & 0 & 0 \\ 0 & 0 & 1 & 0 \\ 0 & 0 & 0 & 1 \end{bmatrix} \times \begin{bmatrix} 1 & 0 & 0 & 0 \\ 0 & 1 & 0 & 0 \\ -\frac{e}{S} & 0 & 1 & 0 \\ 0 & 0 & 0 & 1 \end{bmatrix}$$

It should be apparent to those skilled in the art that these matrices must be applied in the correct order. If not, the scaling will be applied to the shear term as well, which will give incorrect perspective projection.

The perspective division is not visible in the above matrix implementation. The projection matrix is assumed to have been already setup in the initialisation process of the pipeline and the matrices above are multiplied to shear the original projection matrix defining the original symmetric frustum.

Camera in Viewing Plane

In previous sections the rendering transformation is performed by placing a camera at an aperture position and manipulating vertex coordinates to correct the vertical perspective. However, if it were possible to keep the camera at the viewing distance D, but transform any object coordinates as if the camera was located at the aperture entrance, then it would be possible for an object displayed on the apparatus to exceed the shutter distance i.e. objects could be displayed having a z coordinate value between the distances S and D (objects between the shutter and the observer).

Figure 22:
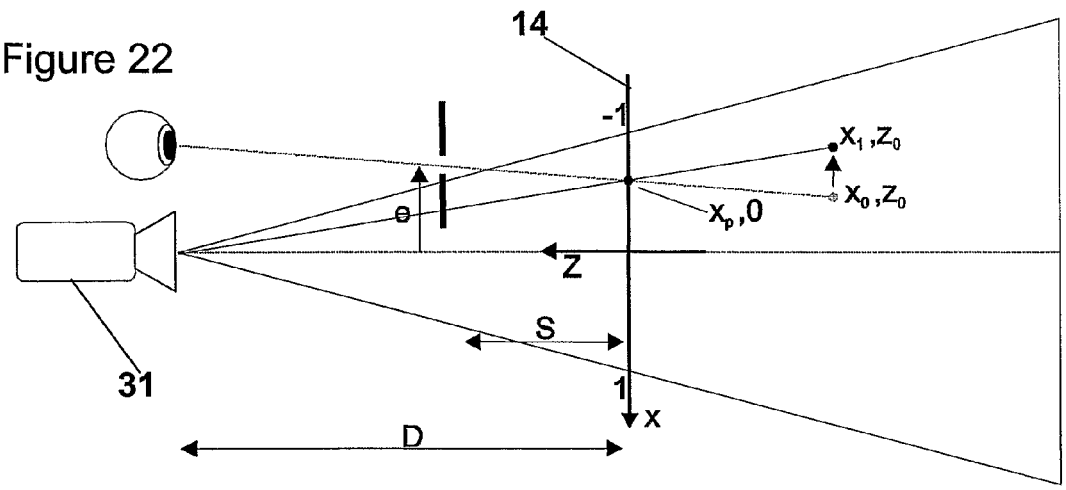
FIG. 22 shows how translating x gives the correct projection for a camera at D away from the origin, for an eye looking through aperture at distance e off axis.

FIG. 22 shows the principle of the second rendering method. The shutter is placed in the desired position and a ray is traced from the object point through the aperture. The projected point $x_p$ will be perceived by a viewer as originating from point $(x_o, z_o)$ as FIG. 22 shows. However, in this case we will keep the camera position at the original position (0, 0, D). The equation for $x_1$ is thus:

$$x_1 = \frac{D - z_0}{D} \times x_p$$

Using similar analysis as above we arrive at:

$$\frac{x_p - e}{S} = \frac{x_0 - e}{S - z_0}$$

$$x_p = \left(\frac{x_0 - e}{S - z_0}\right) \times S + e$$

$$x_1 = \left(1 - \frac{z_0}{D}\right)\left(\frac{S x_0}{S - z_0} - \frac{S e}{S - z_0} + e\right)$$

Note that substituting D for S in the above equation moves the camera to the aperture location. The equation for $x_1$ above is difficult to implement in matrix notation due to the $x_o \times z_o$ term that arises. The equation is non-linear and hence cannot be implemented in a linear system. There are ways around this problem. One solution is to write a wrapper that intercepts the openGL pipeline and implements the equation. If one has access to the code, one can also implement the equation directly. An efficient way is to use vertex shader language and implement the non-linear transforms in the graphics card directly. The analysis above only covers rendering in the x-direction, because the y-rendering follows the standard mathematics as previously described.

Figure 23:
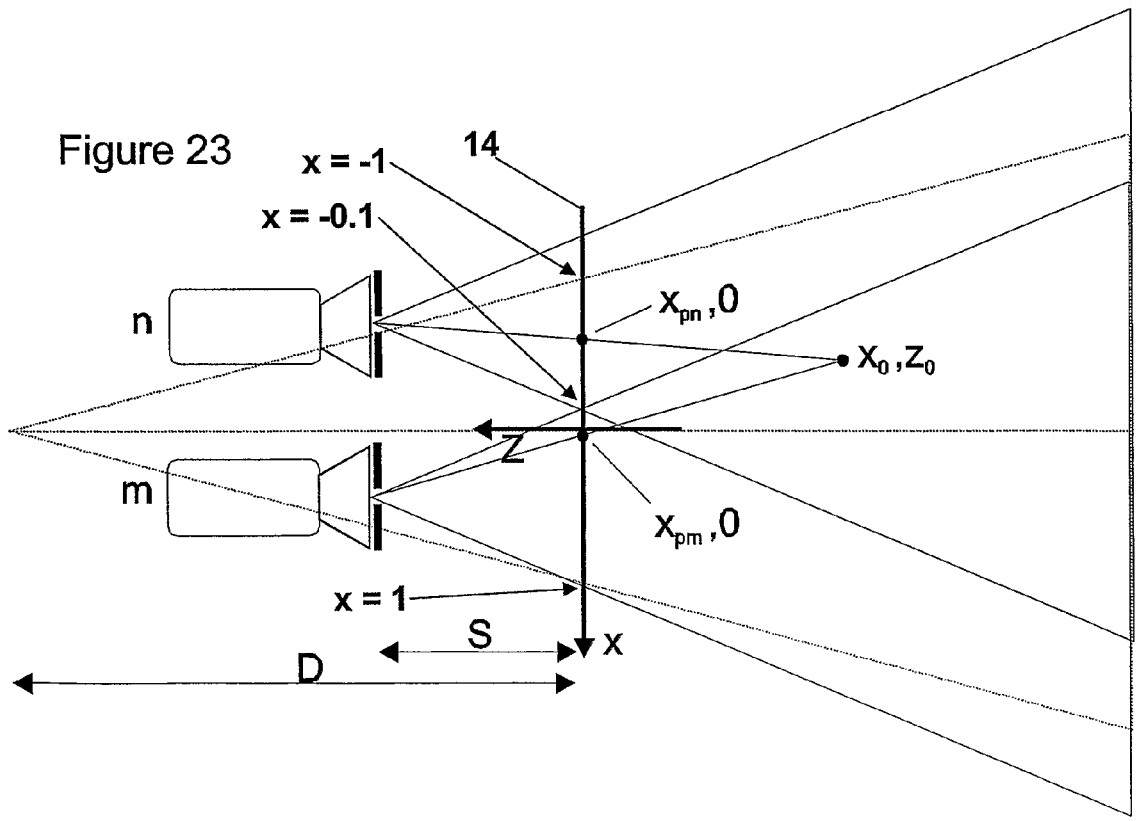
FIG. 23 shows how translating the camera along x gives a correct projection, but an incorrect pixel coordinate for a frustum that does not cover the whole scene.

Relevant to both of the above described rendering methods is that so far it has been assumed that the image source has unlimited bandwidth, that is, it has been assumed that each slit has a complete corresponding image that is displayed across the entire stereo window, so from −1 to 1. Unfortunately such systems are difficult to implement, because current display devices are limited in bandwidth. Therefore it is impossible in practice to make such a 3D display with a large slit number. With a low slit number and a reasonable sized screen, the slit size becomes large, which will limit the allowable depth and cause disturbing discontinuities at slit boundaries. One solution is to sacrifice some of the bandwidth and decrease slit width at the expense of narrower viewing angle. This can best be understood by considering a viewer far off axis in the system shown in FIG. 23. At some point looking through slit n far off axis, he or she will eventually be able to see the region captured by camera m. The solution to allow narrower slits yielding clearer and deeper images is to place several sub-images within the larger display image or frame. FIG. 23 shows this method. By shifting the camera along the x-axis the projection remains correct, however the pixel coordinate is wrong. As discussed above, by clipping the image one can achieve an asymmetric viewing frustum which is tantamount to shifting the pixel coordinate. The asymmetry of the frustum arises purely as a result of the frustum being forced to constantly intersect the 1 and −1 point. The two projection frustum of position n and position m intersect on the projection plane 14. In this example, the point of intersection will be x=−0.1. As a result two cameras cover the entire stereo window in addition to the regions outside 1 and −1. Together they utilize all the pixels available on the display, i.e. camera at position n from approximately −0.1 to −1 and camera at position m from 1 to −0.1. Projection point $x_{pm}$ is expected to be close to the origin. However, from the frustum of camera position m we see that is close to the −1 edge. This pixel would be mapped far away from the desired position and this is accounted for by translating the pixel. The analysis that follows explains the mathematics to allow several perspective sub-images to be captured and displayed correctly within a single 3D display frame.

Figure 24:
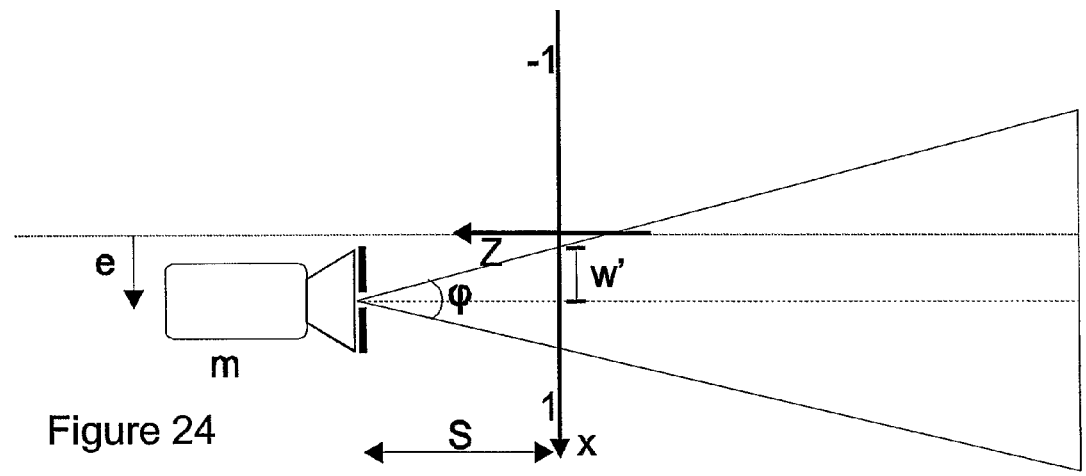
FIG. 24 shows a camera at a distance S from the projection plane and offset from the z axis by a distance e.

The analysis that follows is much like before, but care is taken to achieve the correct pixel mapping. As explained earlier, the horizontal and vertical resolution ($2N_w$, $2N_h$) describes the size of a viewport. The viewport resolution will correspond to the native display resolution on which the 3D images are to be displayed. In the previous analysis this was simple since each slit had an entire corresponding image or frame, thus the resolution for each image would be ($2N_w$, $2N_h$). However, when placing several sub-images within a frame, it is crucial to ensure the correct viewport resolution is used which fits the display resolution. The variable $\phi$ (phi) describes the width of each sub-image and is referred to as the slit viewing angle. FIG. 24 shows a camera located at a position corresponding to slit m, where the width 2w' and aspect ratio A' of the sub-image is given by:

$$w' = \tan\left(\frac{\varphi}{2}\right) \times S$$

$$A' = \frac{w'}{h_0} = \frac{w'}{\tan\left(\frac{\theta}{2}\right) \times D}$$

where $h_o$ is the original height of screen which has remained unchanged throughout. Since the width w' of the sub-image or the view port of the camera at m is known, the sub-image resolution $N'_w$ relative to the native display resolution $N_w$ can be found by:

$$N'_w = \frac{w'}{w_0} \times N_w = \frac{w'}{\tan\left(\frac{\theta}{2}\right) \times DA_0} \times N_w$$

Figure 25:
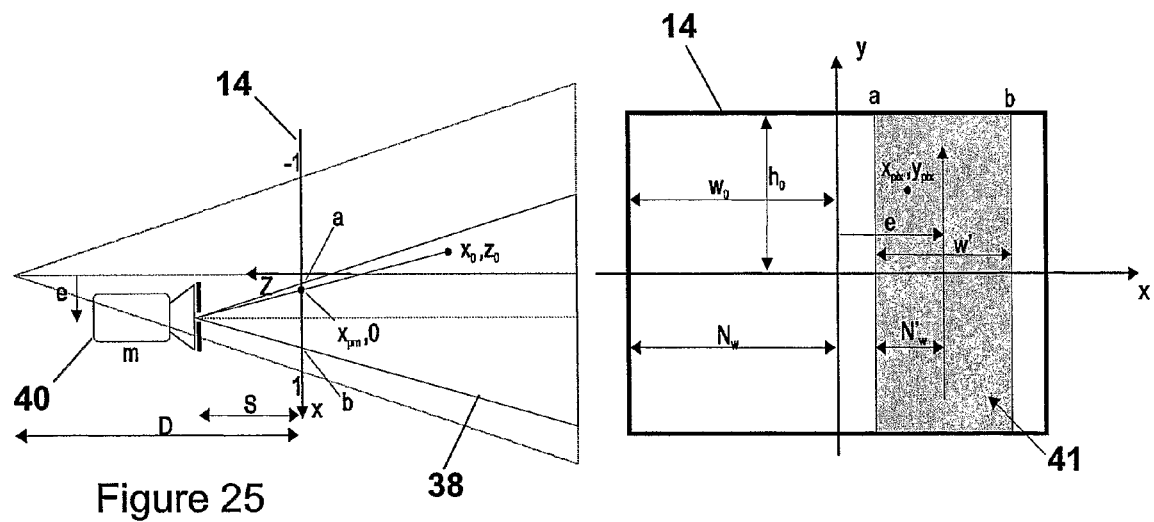
FIG. 25 shows a camera and projection plane as arranged in FIG. 24, and a view of the sub-image from the projection plane.

FIG. 25 shows a new small frustum 38 where the −1 and 1 points are located at a and b respectively. A camera is positioned at position 40, a distance e off the z-axis corresponding to aperture m and at a distance S from the projection plane 14, i.e. at the position of aperture m. The new small frustum 38 for this configuration is a standard symmetric frustum and shall be called the a to b frustum 38. The equation for the pixel coordinate $X_{m_{pix}}$ within the a to b frustum 38 is thus:

$$x_{pm} = \frac{S(x_0 - e)}{(S - z_0)}$$

$$x_{m_{pix}} = \left(1 + \frac{x_{pm}}{w'}\right) \times N'_w = \left(1 + \frac{S(x_0 - e)}{(S - z_0)\tan\left(\frac{\theta}{2}\right) \times DA'}\right) \times N'_w$$

This equation gives the pixel coordinate within the a to b frustum 38. However, for the pixel to be correctly mapped within the entire frame the point a must be found, thus giving the pixel index of where the sub-image 41 should be placed. The pixel coordinate $a_{pix}$ is given by:

$$a_{pix} = \left(1 + \frac{e - w'}{w_0}\right) \times N_w$$

Therefore the pixel coordinate $x_{pix}$ of the point ($x_o$, $z_o$) within the context of the entire frame is given by:

$$x_{pix} = x_{m_{pix}} + a_{pix}$$

$$= \left(1 + \frac{S(x_0 - e)}{(S - z_0)\tan\left(\frac{\theta}{2}\right) \times DA'}\right) \times N'_w + \left(1 + \frac{e - w'}{w_0}\right) \times N_w$$

where the first term represent the projection coordinate within the sub-image and the last term represents the index a within the entire frame. Hence the above equation gives the pixel coordinate within the entire frame. This result coincides with the previously defined equations for the pixel coordinates, since the location of the projected pixel is purely a function of the aperture location. Indeed by substitution it can be shown that the equation for $x_{pix}$ above corresponds to the equation for $x_{pix}$ derived in the camera in shutter plane section above.

The previous analysis, unlike before, used symmetric frustums. Although this might seem desirable, there is little advantage computationally for such an approach since the asymmetric frustums are linear shears and can be computed easily by a graphics card. The reason why the low-bandwidth rendering approach is desirable is because we limit the viewport to a lower resolution, hence less pixels to calculate and therefore faster to render. This is simply to avoid calculating a full resolution image when only a fraction of the image will be used for the 3D perspective due to clipping.

With the camera in viewing plane approach, the camera was placed at the optimum viewing distance D, but the object was translated as if the camera was located at a slit. This approach allowed objects in front of shutter plane to be captured. This section will incorporate the same approach, but over a limited region, again introducing the concept of a sub-image to increase the efficiency and allowing deep images for a low bandwidth display (however at the expense of a limited viewing angle).

Figure 26:
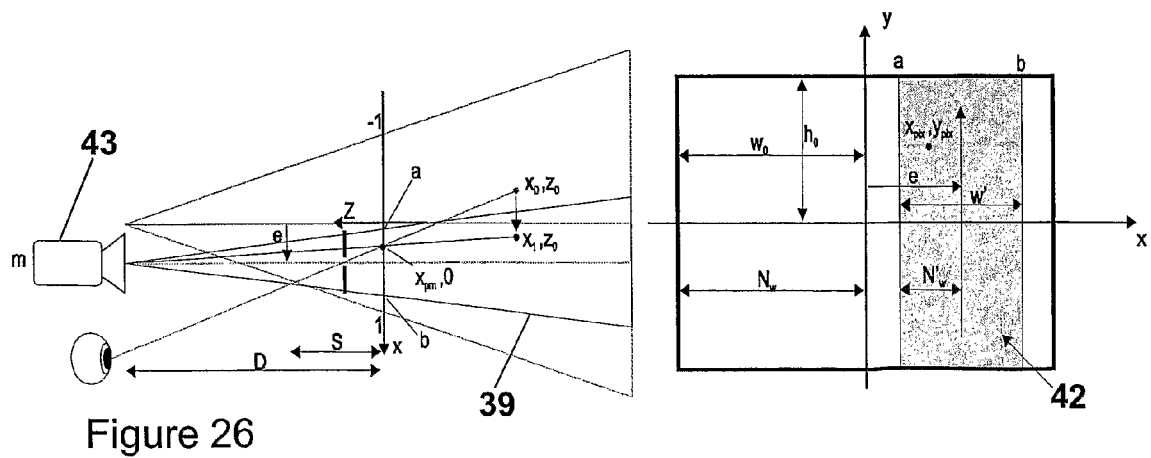
FIG. 26 shows a translated object point and how this is seen by an observer.

FIG. 26 shows a camera at a position 43 a distance e off the z-axis corresponding to aperture m and at a distance D from the projection plane 14. FIG. 26 also shows a frustum 39, again where the −1 and 1 points are located at a and b respectively. Frustum 39 corresponds to the camera at position 40 and a sub image 42. From FIG. 26 the equations for the point $x_0$ and its corresponding shifted point $x_1$ (translated object coordinate) yield:

$$\frac{x_1 - e}{D - z_0} = \frac{x_p - e}{D}$$

$$\frac{x_0 - e}{S - z_0} = \frac{x_p - e}{S}$$

Note that all values here are relative to the origin and not the camera's optical axis located at e. By substituting the equations above and solving for $x_1$:

$$x_1 = \left(1 - \frac{z_0}{D}\right)\left(\frac{Sx_0}{S - z_0} - \frac{Se}{S - z_0}\right) + e$$

This equation is applied to all the x values such that the projection corresponds to a camera located at the aperture (position 40). By using the same analysis as before, it can be shown that the pixel equation within the context of frustum 39 is given by:

$$x_{m_{pix}} = \left(1 + \frac{S(x_0 - e)}{(S - z_0)\tan\left(\frac{\theta}{2}\right) \times DA'}\right) \times N'_w$$

The analysis for the point a is as before and is given by:

$$a_{pix} = \left(1 + \frac{e - \omega'}{w_0}\right) \times N_w$$

thus the pixel equation $x_{pix}$ within the context of the entire frame is given by $x_{m_{pix}} + a_{pix}$ which yields the following equation:

$$x_{pix} = \left(1 + \frac{S(x_0 - e)}{(S - z_0)\tan\left(\frac{\theta}{2}\right) \times DA'}\right) \times N'_\omega + \left(1 + \frac{e - \omega'}{\omega_0}\right) \times N_w$$

as expected. This low bandwidth or simultaneous multiple perspective image display method yields a very similar result as before.

By way of illustration, an elementary implementation of the above rendering method will now be described. This section will give an example on how a low bandwidth rendering process could be implemented in practice. The section has been included to give the reader a better understanding of why such an approach is desirable. The 3D display used in the example will have the following properties:

Screen refresh rate $R_f$=200 Hz
Number of slits $N_s$=12

It will be assumed that the temporal bandwidth of the human eye is 50 Hz. Since each slit must be updated at this rate, the system can support a frame number of 4, that is 4 distinct individual images or frames can be displayed, since:

$$\text{Frame-number} = \frac{200 \text{ Hz}}{50 \text{ Hz}} = 4$$

Figure 27:
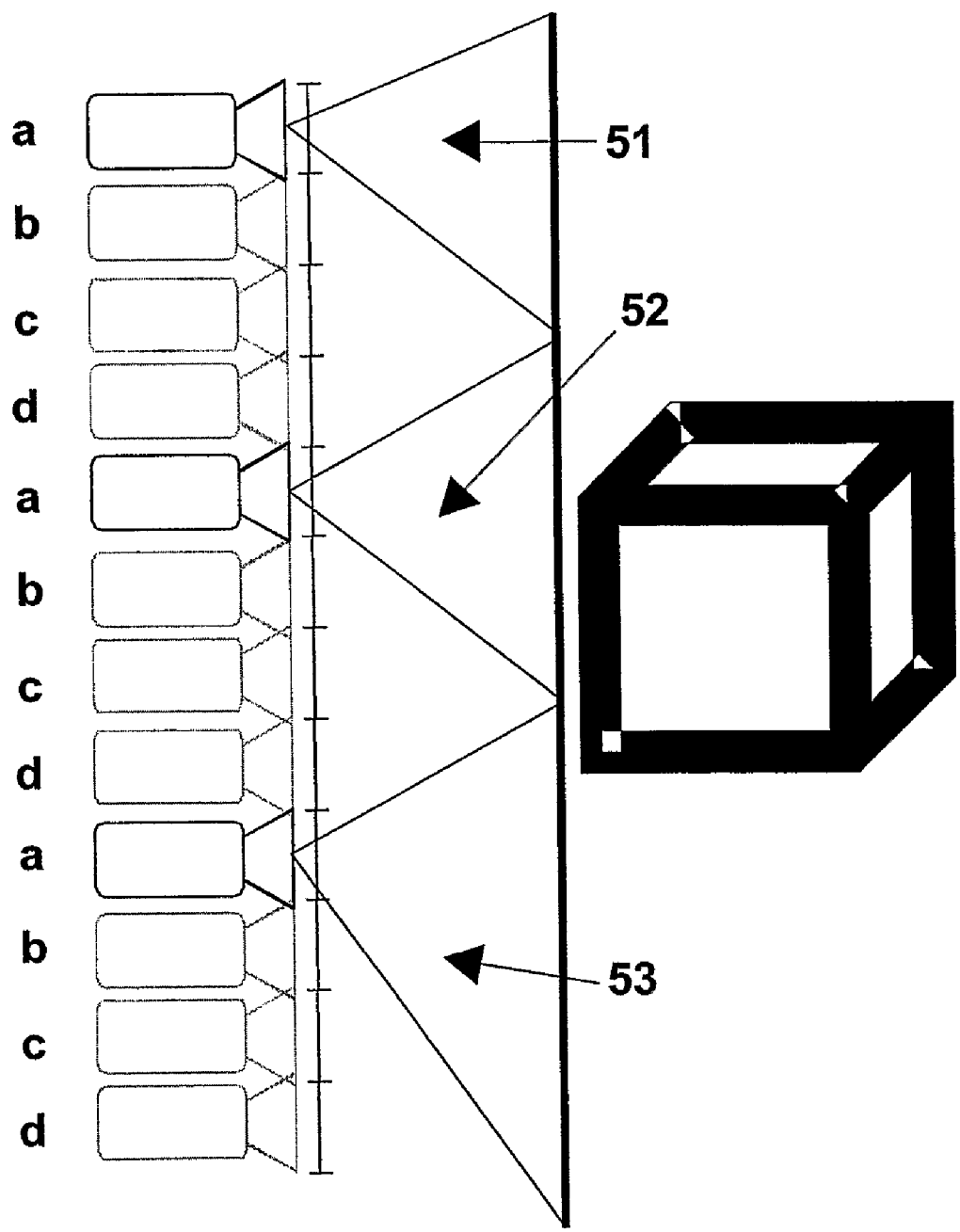
FIG. 27 shows an example of sub-images implemented within a sub-frame.

As FIG. 27 shows, 3 apertures are opened simultaneously and located behind each slit would be the corresponding perspective sub-image. If there had been only one slit per image, although the viewing angle would have been large, the slit width would be correspondingly large and give undesirable effects. At some point the slit will become so large that stereopsis cannot be achieved.

In FIG. 27 the individual frustums are shown in different sizes. First sub-image 51 contains fewer pixels then second and third sub-images 52 and 53 respectively. Although the mathematical approach described in the previous section dealt with symmetric frustums, they can, and in practice often are asymmetric as shown in FIG. 27. The shape of the frustum is dependent on many aspects such as desired viewing angle, display dimensions etc. An issue is to ensure that the sub-image maps correctly within the entire frame.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of creating image data, the image data suitable for use with an autostereoscopic display, the method comprising processing item coordinates representing at least one item in a 3D scene to provide the image data, wherein the processing comprises a non-linear transformation step and a projection step, wherein:
   the non-linear transformation step comprises calculating a non-linear transformation dependent on a geometry of the autostereoscopic display; and
   the projection step comprises calculating a projection dependent upon a projection plane.

2. A method as claimed in claim 1, wherein the non-linear transformation step is arranged to provide image data comprising a corrected perspective view of the 3D scene.

3. A method as claimed in claim 1, wherein the projection step precedes the non-linear transformation step, the projection step creates projected coordinates, and the non-linear transformation step is performed on the projected coordinates.

4. A method as claimed in claim 3, wherein the 3D scene is stored in hardware and the projecting step comprises forming a projected image of the scene with a virtual camera at an observation position.

5. A method as claimed in claim 3, wherein the 3D scene is stored in hardware and the projecting step comprises forming a projected image of the scene with a virtual camera at an aperture position.

6. A method as claimed in claim 1, when the non-linear transformation step is performed on the item coordinates, wherein the projection step follows the non-linear transformation step.

7. A method as claimed in claim 6, wherein the 3D scene is stored in hardware and the projecting step comprises forming a projected image of the scene with a virtual camera at an observation position.

8. A method as claimed in claim 6, wherein the 3D scene is stored in hardware and the projecting step comprises forming a projected image of the scene with a virtual camera at an aperture position.

9. A method as claimed in claim 1, wherein the non-linear transformation step implements a camera positioned at a shutter spacing, the camera having a scaled frustum and capturing image data having translated y coordinates.

10. A method as claimed in claim 1, wherein the transformation step implements a camera positioned at an observation distance, the camera capturing image data having translated x coordinates.

11. A method as claimed in claim 1, wherein the non-linear transformation is dependent upon a geometric consideration of an aperture.

12. A method as claimed in claim 11, wherein the geometric consideration of the aperture includes: aperture width; a separation distance between an image display surface and the aperture; and a typical observation distance.

13. A method as claimed in claim 1, wherein the image data comprises an image segment, a 2D representation of a 3D scene, or information about a 2D representation of a 3D scene.

14. A method as claimed in claim 1, wherein the image data comprises an image having a first perspective in a horizontal direction corresponding to a first observation distance and a second perspective in a vertical direction corresponding to a second observation distance.

15. A method according to claim 1, wherein the autostereoscopic display operates so as to display a portion of an image dependent upon a viewing angle.

16. A method as claimed in claim 15, wherein the viewing angle is a horizontal viewing angle in a horizontal plane.

17. A method of creating image data representing an image segment, the image segment suitable for use with an autostereoscopic display, said method comprising processing item coordinates representing at least one item in a 3D scene to provide said image data, wherein the processing comprises a projection step and a non-linear transformation step, wherein: the non-linear transformation step comprises calculating a non-linear transformation dependent on the geometry of the autostereoscopic display; and the projection step comprises calculating a projection dependent upon a projection plane.

18. A method according to claim 17 wherein the autostereoscopic display operates so as to display a portion of an image dependent upon a viewing angle.

19. A graphics processing apparatus for use in a computer system having an autostereoscopic display, the graphics processing apparatus comprising: a processing means for calculating a projection of a plurality of item coordinates representing at least one item in a 3D scene onto a projection plane; and a processing means also for calculating a non-linear transformation dependent upon the geometry of the autostereoscopic 3D display.

* * * * *